(12) United States Patent
Scott et al.

(10) Patent No.: US 6,414,400 B1
(45) Date of Patent: Jul. 2, 2002

(54) SMALL ENGINE DRIVEN GENERATOR

(75) Inventors: Harold C. Scott, Lafayette; Henry Tally, Boulder, both of CO (US); Chiping Sun, Pittsburgh, PA (US)

(73) Assignee: Coleman Powermate, Inc., Kearney, NE (US)

( * ) Notice: Subject to any disclaimer, the term of this patent is extended or adjusted under 35 U.S.C. 154(b) by 0 days.

(21) Appl. No.: 09/496,455

(22) Filed: Feb. 2, 2000

Related U.S. Application Data

(60) Provisional application No. 60/118,690, filed on Feb. 3, 1999.

(51) Int. Cl.[7] ............................. F02N 11/06; H02P 9/04
(52) U.S. Cl. ................ 290/40 C; 290/40 R; 290/40 A; 290/40 B; 290/40 E; 290/40 F; 290/41
(58) Field of Search .................... 290/40 A, 40 B, 290/40 C, 40 D, 40 E, 40 F; 123/192.1, 413

(56) References Cited

U.S. PATENT DOCUMENTS

| | | | |
|---|---|---|---|
| 4,074,665 A | 2/1978 | Patis | 123/102 |
| RE31,230 E | 5/1983 | Swift et al. | 322/91 |
| 4,439,721 A | 3/1984 | Mura | 322/31 |
| 4,505,169 A * | 3/1985 | Ganoung | 74/858 |
| 4,646,896 A * | 3/1987 | Hammond et al. | 192/98 |
| 4,661,761 A | 4/1987 | Katsumata | |
| 5,582,149 A * | 12/1996 | Kanno | 123/413 |
| 5,653,208 A * | 8/1997 | Nakamura | 123/413 |
| 5,690,063 A * | 11/1997 | Motoyama et al. | 123/73 A |
| 5,703,410 A | 12/1997 | Maekawa | 294/40 C |
| 6,148,784 A * | 11/2000 | Masberg et al. | 123/192.1 |

* cited by examiner

Primary Examiner—Elvin Enad
(74) Attorney, Agent, or Firm—William R. Bachand; Squire, Sanders & Dempsey, L.L.P.

(57) ABSTRACT

A power conversion system includes an engine coupled to drive an alternator, a rectifier circuit, and an ignition controller. The alternator includes a stator and a rotor that cooperate when driven to provide a current supplied to the rectifier circuit. The rectifier circuit provides output power having a voltage. The ignition controller supplies energy to the spark plug of the engine. If the voltage exceeds a predetermined limit, the ignition controller supplies less energy to the spark plug to decrease engine drive. The stator may include several windings (or a tapped winding) and the system further includes an engine throttle controller and a winding control circuit. The winding control circuit selectively couples one or more windings of the plurality (or one or more turns of a tapped winding) to the rectifier circuit. The winding control circuit cooperates with a throttle controller to facilitate provision of a predetermined output power with a relatively low engine RPM for noise abatement.

20 Claims, 29 Drawing Sheets

SMALL ENGINE DRIVEN GENERATOR

This application claims benefit of provisional application Ser. No. 60/118,690 filed Feb. 3, 1999.

FIELD OF THE INVENTION

The present invention relates to systems for converting mechanical energy to electrical energy; and, more specifically, to power conversion systems employing a relatively small engine.

BACKGROUND OF THE INVENTION

In general, power conversion systems comprising a generator and an energy source, such as an engine, a motor, or a turbine, are well known. The generator typically comprises a rotor and a stator arranged for rotation relative to each other. Generally, the rotor is driven by the energy source, often mounted on the shaft of the engine, motor, or turbine. The rotor typically generates a magnetic field (using either permanent magnets or windings) that interacts with windings maintained on the stator. As the magnetic field intercepts the windings, an electrical current is generated. The induced current is typically applied to a bridge rectifier. The bridge rectifier output is sometimes regulated and provided as a DC output of the power conversion system. In some instances, the rectified signal is applied to an inverter to generate an AC output.

Portable power conversion systems find particular utility as: power sources for lights and small appliances used, for example, at construction or camping sites; power sources used in connection with recreational vehicles; and vehicular battery charger/jump start units. For vehicular units, it is desirable that the unit be capable of both charging a vehicle battery and jump starting a vehicle. When charging, the unit should deliver a tapered charge to the battery and avoid over-charging the battery. When jump starting, the unit should deliver full power. Vehicle electronics can be damaged by voltages that exceed a critical voltage, for example, 18 volts. Accordingly, precautions must be taken to ensure that the critical voltage is not exceeded.

It is also desirable that a power conversion system be able to accommodate wide and rapidly occurring variations in load, i.e., variations in output current. For example, when an incandescent lamp with a cold filament is "plugged in" to the generator, the generator is presented with extremely low resistance, resulting in an extremely high output current, often in excess of ten times the average output current. In the absence of special provisions, components typically must be rated for the anticipated peak output current rather than for the much lower magnitude of the average output current. The requirement for components rated for peak output current much higher than the average output current tends to add considerable expense to the generator.

It is particularly desirable that a power conversion system be lightweight and inexpensive. Generators which use permanent magnets to generate the requisite magnetic field tend to be lighter and smaller than traditional wound magnet generators. However, the power supplied by a permanent magnet generator has historically been difficult to regulate or control. The voltage supplied by such a generator varies significantly according to the speed of the rotor. In addition, the output voltage tends to vary inversely with the output current, i.e., as the output current increases for a given load, the output voltage drops.

Commonly assigned U.S. Pat. No. 5,886,504 describes, among other things, a lightweight, compact power conversion system wherein fuel economy, noise abatement, and the ability to accommodate widely and rapidly varying loads is facilitated through automated throttle control. The system includes an engine, with a throttle; an electromechanical throttle actuator (control device), a permanent magnet alternator; a controlled rectifier; an inverter; and a controller. The throttle control device controls the setting of the throttle in accordance with control signals from the controller. In one embodiment, rotor RPM is maintained at the lowest value necessary to provide a desired output voltage across the load. In another embodiment, the throttle is employed as a mechanism for controlling output voltage and to avoid over-current conditions so that damage to components caused by current surges due to variations in load are avoided by sensing an impending over-current condition, decreasing the output voltage by a predetermined amount or to a predetermined level, then gradually increasing the output voltage to bring the system back to a desired operating condition. A variety of suitable throttle control mechanisms are described.

In the event of a significant decrease in load, such as when a lamp is "unplugged" from the generator and the throttle is already opened relatively wide, the engine speed will increase suddenly. A sudden increase in engine speed, if uncontrolled, can cause engine damage, may cause a rail voltage surge that can damage system electronics, and, if the generator is connected to a vehicle battery, can also cause damage to a vehicle's electronics. An inexpensive mechanism is desirable for avoiding potentially damaging excessive engine speed and voltage surges.

It is also desirable that the system include an inexpensive but reliable mechanism for detecting short circuit loads connected across the system output terminals and for providing suitable indications of overload conditions to a user.

The noise generated by a small internal combustion engine operating at relatively high speed is significantly greater than the noise generated by the same engine at lower speed.

Accordingly, to reduce noise, it is desirable to operate the engine at relatively low speed to the greatest extent possible. However, the torque generated by the engine at low speed can be considerably less than the torque generated by the engine at higher speed. At relatively low speed the engine may not be able to generate sufficient torque to start supplying power when the output terminals are connected to loads having a relatively high initial power requirement.

SUMMARY OF THE INVENTION

A power conversion system, in an implementation according to various aspects of the present invention includes an engine coupled to drive an alternator, a rectifier circuit, and an ignition controller. The alternator includes a stator and a rotor that cooperate when driven to provide a current supplied to the rectifier circuit. The rectifier circuit provides output power having a voltage. The ignition controller supplies energy to the spark plug of the engine. If the voltage exceeds a predetermined limit, the ignition controller supplies less energy to the spark plug to decrease engine drive.

In another implementation, according to various aspects of the present invention, the stator includes a plurality of windings (or a tapped winding) and the system further includes an engine throttle controller and a winding control circuit. The winding control circuit selectively couples one or more windings of the plurality (or one or more turns of a tapped winding) to the rectifier circuit. The winding control circuit cooperates with a throttle controller to facilitate provision of a predetermined output power with a relatively low engine RPM for noise abatement.

BRIEF DESCRIPTION OF THE DRAWING

Embodiments of the present invention will now be further described with reference to the drawing, wherein like designations denote like elements and.

DETAILED DESCRIPTION OF PREFERRED EXEMPLARY EMBODIMENTS

Figure 1:
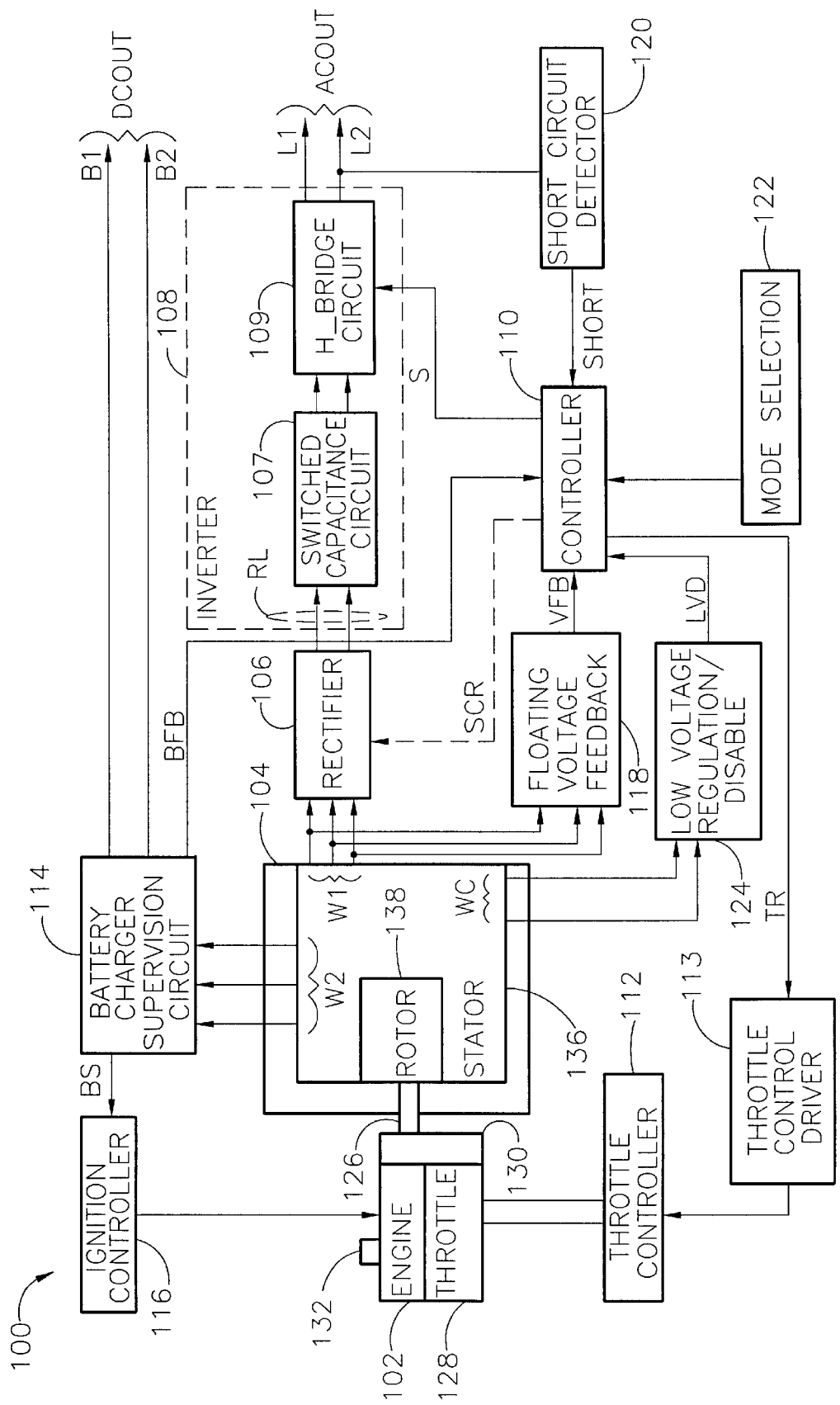
FIG. 1 is a functional block design of a power conversion system in an implementation according to various aspects of the present invention.

Referring to FIG. 1, a power conversion system 100 in accordance with various aspects of the present invention suitably comprises: an engine 102; an alternator 104; a rectifier circuit 106; an inverter circuit 108 having a switched capacitance circuit 107 and H bridge circuit 109; a controller circuit 110; a throttle control apparatus 112; a throttle control driver circuit 113; a battery charge supervision circuit 114; an ignition controller 116; a voltage feedback circuit 118 for generating a floating voltage feedback signal; a short circuit detector 120; a mode selection circuit 122; and a low voltage regulation/disable circuit 124. Power conversion system 100 preferably generates: (a) a DC signal (DCOUT) across terminals B1 and B2 suitable for charging a battery or jump-starting a vehicle; and (b) an AC output signal (ACOUT) across terminals L1 and L2 suitable for powering lights, appliances, and power tools (e.g., 120 VAC, 60Hz).

Engine 102 preferably comprises an internal combustion engine, including a rotational output shaft 126, a throttle mechanism 128, a magneto 130, and a spark plug 132. Magneto 130 is employed to selectively generate a very high voltage across spark plug 132 at a predetermined point in the engine cycle, facilitating timed generation of an arc (i.e., a combustion ignition spark). Shaft 126 rotates at a speed in accordance with the setting of throttle mechanism 128. Throttle control apparatus 112, in cooperation with throttle control driver 113, controls the throttle setting (i.e., affecting the engine speed in RPM) of engine 102 in accordance with control signals from controller 110.

Alternator 104 converts mechanical energy, e.g., the rotation of shaft 126, into electrical energy. Alternator 104 suitably includes a multi-winding stator 136 and a rotor 138 disposed such that rotation of rotor 138 induces a current in the windings of stator 136. Stator 136 preferably includes a laminate core; a plurality (preferably two) of multi-phase (e.g., 3-phase) windings, W1 and W2; and a single phase control winding WC. Stator windings W1 and W2 provide AC signals (with a frequency in accordance with engine RPM) to rectifier 106, voltage feedback circuit 118, and battery charge supervision circuit 114. Stator winding WC provides AC signals to low voltage regulation/disable circuit 124.

Figure 3A:
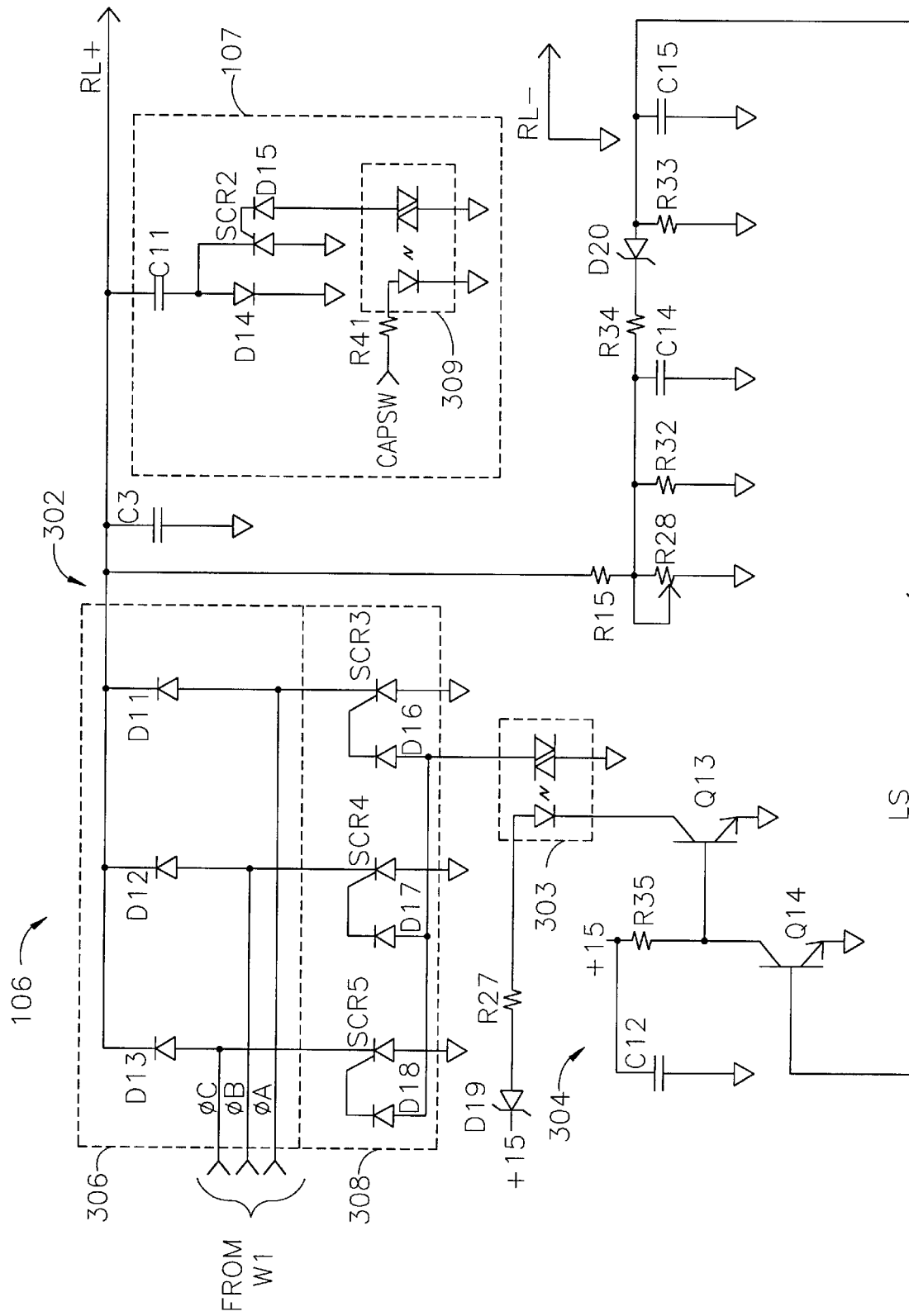
FIGS. 3A and 3B present a schematic diagram of a rectifier circuit and an inverter circuit for the system of FIG. 1.

Rectifier 106 selectively effects current paths through various of the stator windings of alternator 104 to generate one or more uni-polar inverter rail signals RL for application to inverter 108. Rectifier 106 is preferably at least partially switched and/or controlled to provide rail signals RL with a form of voltage regulation. Voltage regulation is preferred to prevent the voltage of rail signals RL from exceeding a predetermined limit (e.g., 125 volts). A preferred embodiment of rectifier 106 will be described in conjunction with FIG. 3.

Inverter 108 receives uni-polar inverter rail signals RL and derives, responsive to control signals (S) from controller 110, simulated AC voltage output signal ACOUT. If desired, feedback from inverter 108 (regarding voltage and/or current) may be provided to controller 110. In a preferred embodiment, current is monitored by short circuit detector 120, which in turn provides a signal to controller 110. In response to detection of a short circuit, controller 110 effectively disables inverter 108. Preferred embodiments of inverter 108 will be described in conjunction with FIG. 3. Preferred embodiments of short circuit detector 120 will be discussed in conjunction with FIG. 7.

Figure 5:
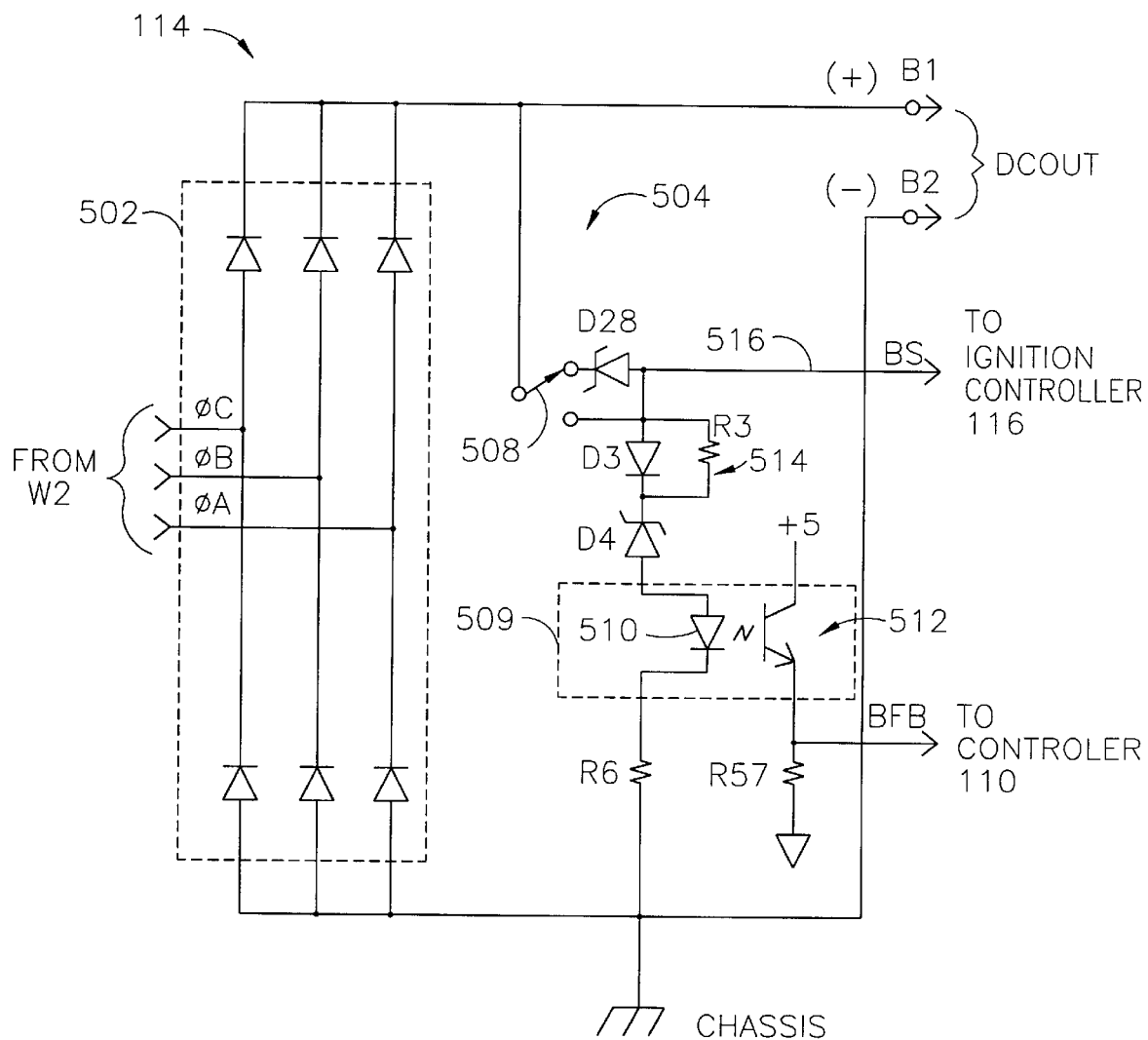
FIG. 5 is a schematic diagram of a battery charger supervision circuit for the system of FIG. 1.

Battery charge supervision circuit 114 rectifies the AC signal from winding W2 to generate DC signal DCOUT across terminals B1 and B2 suitable for charging a battery or for jump-starting a vehicle. Preferably, circuit 114 also provides a feedback signal (BFB) to controller 110 indicative of a property of signal DCOUT relative to a predetermined set point value. In the preferred embodiment, feedback signal BFB is a digital signal indicative of a comparison between the voltage of signal DCOUT and a selected set point value. Controller 110 effects incremental throttle control accordingly. A preferred embodiment of circuit 114 will be described in conjunction with FIG. 5.

Ignition controller 116 prevents the speed of engine 102 from exceeding a predetermined RPM limit. RPM limiting is preferably employed to prevent the voltage of signal DCOUT from exceeding a predetermined voltage (e.g., to avoid overvoltage damage to vehicle electronics) and to prevent instances of perceived engine runaway upon abrupt changes in AC load. In the preferred embodiment, ignition controller 116 comprises a circuit that selectively attenuates the output voltage of magneto 130 to decrease the spark voltage across spark plug 132. Attenuation of the spark voltage affects (e.g., lowers) the speed (RPM) of engine 102. Ignition controller 116 will be more fully described in conjunction with FIG. 6.

Floating voltage feedback circuit 118 provides an unregulated signal (VFB) indicative of engine (alternator) speed and accurately indicative of current provided by winding W1 supplying the AC load. Floating voltage feedback signal VFB is applied as a control signal to controller 110. A suitable floating voltage feedback circuit 118 will be described in conjunction with FIG. 4.

Low voltage regulation/disable circuit 124 cooperates with control winding WC to generate various DC signals that provide power to the electronic components of system 100 and to generate a control signal (LVD) to controller 110 indicative of low voltage conditions, for example, when engine speed is too low to generate the voltages necessary to power the electronic components. A suitable low voltage regulation/disable circuit 124 will be described in conjunction with FIG. 8.

Controller 110 provides suitable control signals to the various components of system 100. Controller 110 suitably comprises a microcomputer that receives one or more feedback signals from the system components (e.g., a signal across terminals L1 and L2, BFB from battery charge supervision circuit 114, signal VFB from voltage feedback circuit 118, signal LVD from low voltage regulation/disable circuit 124, and signal SHORT from short circuit detector 120) and accordingly generates control signals (e.g., signal S to inverter circuit 108 and signal TR to throttle control driver 113). When rectifier circuit 106 includes an actively controlled rectifier, controller 110 suitably provides control signals thereto. Suitable controllers are described in commonly assigned U.S. Pat. Nos. 5,625,276 and 5,886,504. A preferred embodiment of controller 110 will be described in conjunction with FIG. 9.

In general, system 100 effects voltage regulation of output signals DCOUT and ACOUT through feedback control of the throttle setting. Controller 110 generates signals to control the setting of throttle 128 (and thus engine speed) in accordance with a throttle control parameter, preferably chosen in accordance with the setting of mode selection circuit 122. In the preferred embodiment, system 100 operates in one of two control modes: a battery charge/boost (e.g., jump-start) mode, and a load demand mode. While both AC and DC outputs are preferably available in either control mode, a different signal may be used in each mode for the primary throttle control parameter. For example, controller 110 generates signals to control the setting of throttle 128 (and thus engine speed) in accordance with the magnitude of signal DCOUT in the charge/boost mode and in accordance with the magnitude of signal ACOUT (at the output of inverter 108) in the load demand mode. It is particularly economical in some instances to employ an iterative feedback control of the throttle, i.e., decreasing the throttle setting by a predetermined number of units (e.g., one unit) if the control parameter exceeds a threshold value and increasing the throttle setting by a predetermined number of units (e.g., one unit), if the control parameter drops below the threshold value. However, such an iterative control system may not provide a sufficiently fast response in instances where an immediate significant decrease in engine speed is required (e.g., battery charge voltage exceeding a predetermined magnitude or an abrupt change in AC load such as when a power plug is pulled). As will be discussed, use of a simple iterative control system, notwithstanding the relatively long response time of such a system, is facilitated by use of selective RPM limiting. In addition, a modicum of regulation is suitably provided in rectifier circuit 106 irrespective of the present control mode.

As previously noted, engine 102 preferably comprises a small, high RPM, internal combustion engine, with a relatively fast response time relative to changes in throttle setting.

Figure 2:
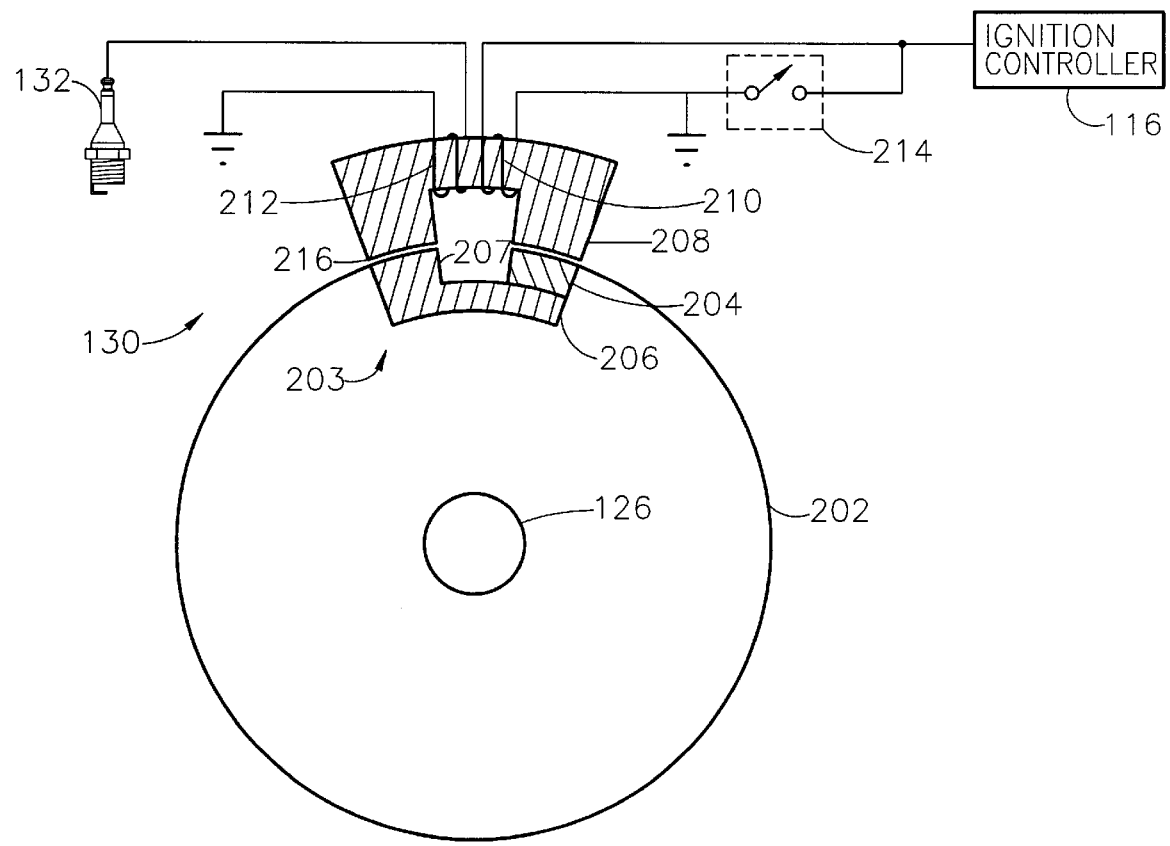
FIG. 2 is a plan view of a magneto and ignition circuit in an implementation according to various aspects of the present invention.

Magneto 130 generates the voltage applied to spark plug 132 to effect a spark for combustion. Referring briefly to FIG. 2, a conventional magneto typically includes: a fly wheel 202 mounted for rotation with engine shaft 126; magnetic components generally indicated as 203, e.g., a permanent magnet 204 and a magnetically soft material portion 206 forming a consequence pole 207; a stationary core 208 of magnetically soft material having a primary coil 210 and a high voltage secondary coil 212 wound thereon; and a switch 214. Core 208 is disposed proximate to fly wheel 202, separated by a predetermined air gap 216 such that core 208 and magnetic components 203 periodically align to form a closed magnetic circuit at a predetermined point in the compression cycle of engine 102.

Primary coil 210, suitably comprising a relatively small number of turns of wire, cooperates with switch 214 and ignition controller 116. Secondary coil 212, suitably comprising a relatively large number of turns of fine wire, is connected to spark plug 132.

Switch 214, disposed to selectively disrupt current flow in primary coil 210, is suitably a mechanical switch (e.g., points activated by a cam lobe in synchronism with the operation of engine 102) or an electronic switch (as used in connection with an electronic ignition).

As flywheel 202 rotates and magnetic components 203 pass core 208, a varying magnetic field is created in the magnetic path formed through soft magnetic material portion 206 and core 208. At an appropriate time for efficient fuel ignition in the compression cycle of engine 102, moving magnetic components 203 and stationary core 208 come into approximate alignment and switch 214 is opened to disrupt the current flow in primary coil 210. Current in primary coil 210 responds to the change in flux through core 208. Accordingly, when the current through primary coil 210 is interrupted, and the magnetic field in core 208 collapses, a very high voltage is induced across secondary coil 212, causing spark plug 132 to generate an arc (spark). As will be discussed, ignition controller 116 selectively attenuates pulses on primary coil 210 to decrease the voltage generated across secondary coil 212.

Referring again to FIG. 1, throttle control apparatus 112 may comprise any device capable of controlling the throttle (speed) setting of engine 102. Often, engine speed is controlled by varying the physical angle of a throttle plate pivotally mounted in the engine carburetor or by controlling a valve in connection with a fuel injection system. The larger the angle of the plate, the larger the opening of the throttle and the faster the speed (RPM) of the engine. Throttle control apparatus 112 suitably comprises an electromechanical actuator responsive to control signals from controller 110 applied thereto (or to throttle control driver circuit 113 associated therewith) for controlling the throttle setting of the engine through a suitable coupling mechanism 134. Examples of suitable control devices are described in the aforementioned U. S. Pat. No. 5,886,504. Throttle control apparatus 112 preferably comprises a conventional stepper motor mechanically coupled to the engine throttle. A mechanical coupling may be effected by, for example, a direct drive, a mechanical linkage, or a cam drive. Examples of suitable coupling mechanisms are also described in the aforementioned U. S. Pat. No. 5,886,504.

Throttle control driver circuit 113 may comprise any circuit capable of providing drive signals suitable for throttle control apparatus 112 in response to control signals from controller 110. For example, a stepper motor typically comprises a rotor coupled to a shaft, the rotor cooperating with a plurality of stator poles, each pole having a stator coil. The rotor includes a predetermined number of poles, preferably formed of permanent magnets. Rotor windings, powered through a conventional slip ring or brush mechanism, can also be utilized. Incremental rotation of the rotor is effected by establishing current paths through the stator coils in predetermined sequences to generate magnetic fields that interact with the magnetic components of the rotor and so cause the rotor to move in predetermined increments. The poles of the rotor tend to move into alignment with the stator poles having a coil through which current is flowing.

Where a stepper motor is employed in throttle control apparatus 112, throttle control driver circuit 113 selectively effects current paths through the stator coils (i.e., activates the coils) in response to control signals from controller 110. Selective activation is effected, e.g., by varying a count employed to generate the control signals. The stepper motor may be operated either in a single activated winding (low power) mode or in paired activated winding (high torque) mode.

In general, the number of poles establishes the resolution of the stepper motor. A typical stepper motor may include 48 stator poles and 48 rotor poles. The resolution of the stepper motor can, however, be improved by a factor of two, i.e., equal to 360° divided by twice the number of poles (e.g., 360/2(48)=3.75° ) by variously energizing a single stator pole winding to bring the rotor into alignment with a corresponding first stator pole, then energizing a pair of stator pole windings to bring the rotor into alignment with the midpoint between the first stator pole and the next.

The effective resolution (i.e., number of steps) from the perspective of the controlled engine can also be multiplied by dithering. For example, by alternately activating each of a pair of successive stator pole coils at a rate faster than the mechanical response time of the rotor (as coupled into the overall system) but slower than the inductive rise time of each respective stator pole coil, the engine reacts as if the throttle was at a setting equal to the average setting over the response period of the engine. If the dithering frequency (i.e., the rate at which the activation control signals are applied) exceeds the inductive rise time of respective stator pole coils, the stepper motor, unable to react to the activation currents, loses torque. If, on the other hand, the switching frequency is less than the inductive rise time of respective stator pole coils but exceeds the mechanical response time of the rotor (e.g., between 10 microseconds in smaller engines and from 0.25 to 0.5 seconds in larger engines), the effective throttle setting, as perceived by the engine, is the position corresponding to the average of the activation states over the period. More specifically, if the frequency is less than the time constant of the system linkage (rotor as connected in the system), but exceeds the response time of the engine, the throttle tends to move between positions corresponding to the respective actuation states at the dithering frequency. However, the engine is unable to respond to such throttle movement and perceives the throttle as being in the average position.

The same averaging effect may also be attained without physical oscillation of the throttle. If the switching frequency exceeds the time constant of the system linkage (i.e., the rotor as connected in the system), mechanical momentum effectively moves the throttle into an intermediate position, corresponding to the time average of the activation states. The linkage is unable to respond to the activation states before they change and, accordingly, the throttle is retained in the intermediate position. In general, it is desirable to use a switching frequency that only minimally exceeds the time constant of the system linkage, for example, the lowest frequency that permits the throttle to assume a static position to avoid wear on a throttle plate and pivot mechanism.

Alternator 104 converts mechanical energy (e.g., the rotation of shaft 126) into electrical energy. Rotation of rotor 138 coupled to shaft 126 induces a current in windings W1, W2, and WC of stator 136. Rotor 138 is preferably: (a) a permanent magnet rotor employing high energy product magnets (e.g., having a flux density of at least on the order of 5 kilogauss) and consequence poles; and (b) of sufficiently light weight that it can be maintained in axial alignment with, and rotated in close proximity to, stator 136 (i.e., with a relatively small predetermined air gap, for example, in the range of 0.02 to 0.06 inch, and preferably 0.03 inch) without the necessity of any bearings in addition to those conventionally included in engine 102.

Stator 136 preferably includes: a laminate core; at least one, and preferably two, multi-phase (e.g., 3-phase) windings W1 and W2; and a single phase control winding WC. If more than one multi-phase winding is employed, they are preferably formed with the respective coils of each phase grouped together and concurrently wound about the laminate core as a unit, i.e., the turns of the respective windings (e.g., for the length of the shortest winding) are wound together in close thermal contact with each other. Control winding WC is suitably wound concurrently on the stator core with a predetermined one of the phases of one of the multi-phase windings (e.g.,W1). Although control winding WC may be physically wound with a phase of winding W1, control winding WC is operatively connected in the system irrespective of the function of the winding with which it is wound. Each stator winding includes a predetermined number of turns corresponding to the voltage output associated with that winding. If desired, respective portions of the windings can be switched in and out of the operative circuit to vary the effective number of turns of the winding, for example, to alter the relationship between RPM and output for noise control. A suitable stator is described in the above-referenced U.S. Pat. No. 5,886,504. Preferably, stator 136 includes: a 3-phase winding W1 (e.g., 18 turns per phase) for use in connection with rectifier circuit 106 and inverter circuit 108; a control winding WC (e.g., 7 turns) for use in connection with low voltage regulation/disable circuit 124; and a charge winding (e.g., 3 turns) for use in connection with battery charger supervision circuit 114.

The output of stator winding W1 is employed to generate AC output signal ACOUT. More particularly, winding W1 is coupled to rectifier circuit 106 and voltage feedback circuit 118. Rectifier circuit 106 may be implemented by any circuit capable of generating one or more uni-polar inverter rail signals RL for application to inverter circuit 108. For example, rectifier circuit 106 may comprise a controlled rectifier responsive to control signals from controller 110, for example, a rectifier bridge having a respective leg associated with each phase comprising: a power diode; a connecting switch or relay (e.g., an SCR); and a control diode. Suitable controlled rectifiers are described in the above-referenced U.S. Pat. No. 5,886,504. In the preferred embodiment, referring to FIG. 3A, rectifier circuit 106 comprises a three-phase bridge rectifier 302 cooperating with a suitable firing control circuit 304. More particularly, rectifier 302 suitably comprises a set of three diodes 306 (D11, D12, and D13), suitably a 3-diode block, and a set of three associated SCRs 308 (SCR3, SCR4, and SCR5). The anodes of diodes 306 are connected to the respective phases of winding W1. The cathodes of diodes 306 are connected in common to an inverter rail RL+. The cathodes of SCRs 308 are connected to the respective phases of winding W1. The anodes of SCRs 308 are connected to an inverter rail RL−, which is system ground. The gates of SCRs 308 are coupled through respective diodes D18, D17, and D16 and an opto coupler 303 photo-element to ground. Diodes D18, D17, and D16 provide isolation between the respective SCRs, preventing the firing of one SCR from feeding back and firing the other SCRs.

Firing control circuit 304 controls the firing of SCRs 308 to effect regulation. More specifically, in the preferred embodiment, so long as the voltage or rail signal RL does not exceed a predetermined maximum value (e.g., 125 volts), circuit 304 maintains all of SCRs 308 in an enabled condition. When continuously enabled, SCRs 308, in effect, operate as diodes and rectification by bridge rectifier 302 is effected as if by a diode bridge. However, if the voltage of signal RL exceeds the predetermined value, the SCRs are, in effect, disabled by removal of the requisite gate voltage. More specifically, firing control circuit 304 suitably comprises an LED/photo-triac opto-coupler 303; respective transistors Q13 and Q14; respective resistors R35, R32, R28, R34, R33, R27 and R38; zener diodes D19 and D20; and capacitors C14, C15, and C12. Resistors R15, R32, and R28 cooperate as a voltage divider to generate a level shifted voltage indicative of the voltage amplitude of signal RL. Capacitors C14 and C15 cooperate with resistors R33, R34, R28 and R32 to provide a filter to smooth out ripple in the level shifted voltage.

Transistor Q13 is normally conductive, providing a current path through the LED portion of opto-coupler 303 and enabling SCRs 308. More specifically, the collector of transistor Q13 is coupled to a 15-volt supply through the LED of opto-coupler 303, resistor R27 (suitably 360 ohms), and a zener diode D19 (suitably 8.2 volts). The base of transistor Q13 is connected to the 15-volt supply through resistor R35, suitably of a greater value than resistor R27 (e.g., 1.5 K ohms) and to the collector of transistor Q14. The emitters of transistors Q13 and Q14 are both connected to system ground. Accordingly, so long as transistor Q14 is not rendered conductive, transistor Q13 is biased on, providing a current path through the LED of opto-coupler 303 which actuates the opto-coupler photo element. When the photo-element of opto-coupler 303 is rendered conductive, current flows through isolation diodes D18, D17, and D16 respectively, enabling SCRs 308. So long as opto-coupler 303 is conductive, current is injected into the control electrode (gate) of SCRs 308. SCRs 308 are thus commutated on and off in accordance with the amplitude of the associated phase of the output of stator winding W1.

Transistor Q14 is, in effect, responsive to a level shifted signal LS indicative of the voltage of signal RL and is rendered conductive to disable transistor Q13 (and thus SCRs 308) when the voltage of signal RL exceeds a predetermined value (e.g., 125 volts). More specifically, the collector of transistor Q14 is connected to the base of transistor Q13. The emitter is connected to system ground. And, the base is connected to the juncture between zener diode D20 and resistor R33. Thus, so long as zener diode D20 is not conductive, the base of transistor Q14 is, in effect, pulled to ground and transistor Q14 is rendered non-conductive. However, when the voltage of signal LS exceeds the break over point of zener D20 (e.g., 8.2 volts), transistor Q14 is rendered conductive. The relative values of resistors R15, R32, R28, R34, and R33 are chosen such that the voltage of signal LS exceeds the break over point when the voltage of signal RL exceeds the predetermined maximum value. Thus, SCRs 308 are disabled when the voltage of signal RL exceeds the predetermined value to provide regulation.

Figure 3B:
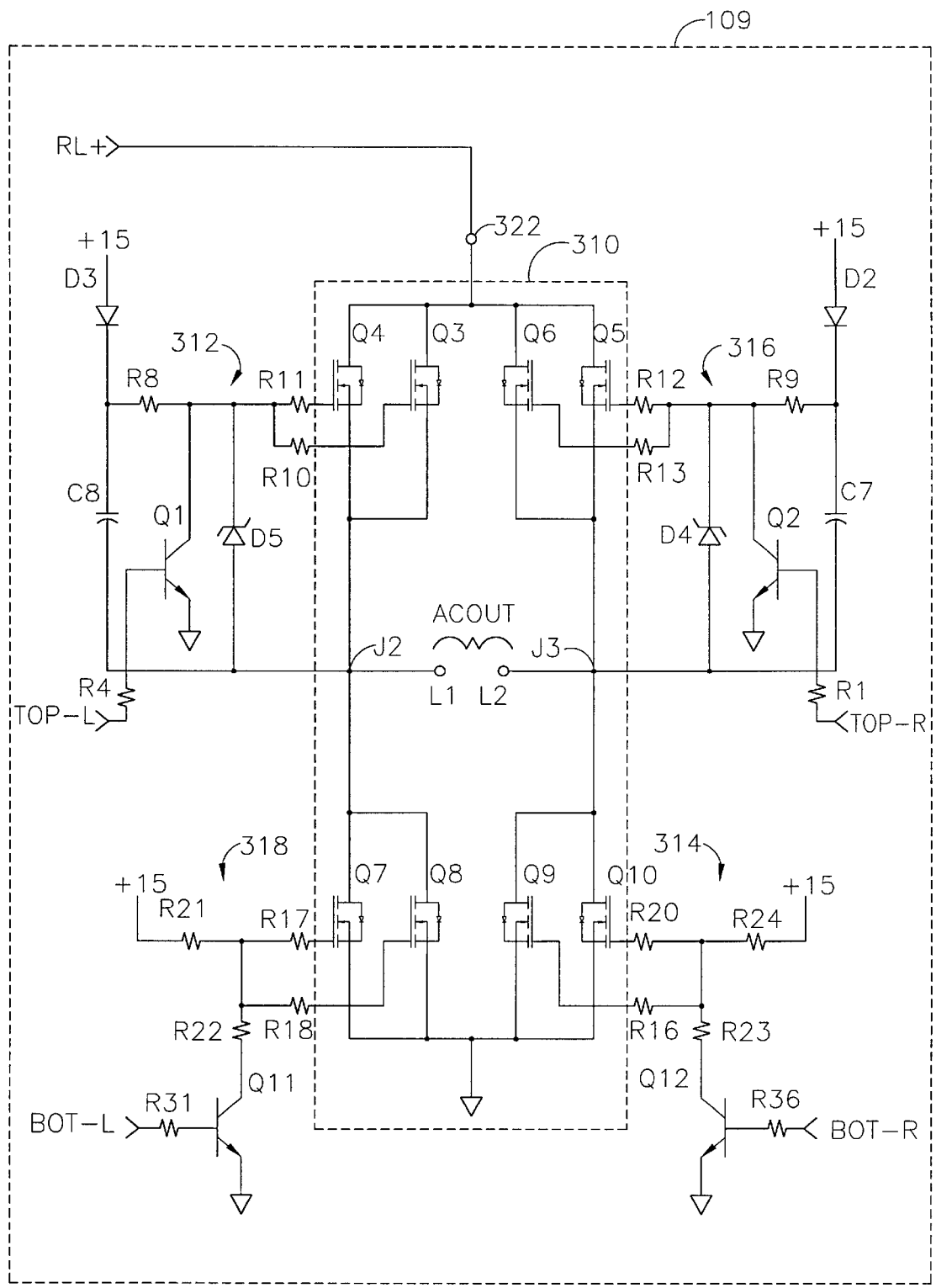

Referring now to FIGS. 1 and 3B, inverter 108 provides simulated sine wave AC voltage output signal ACOUT at output terminals L1 and L2 (e.g., a standard AC power receptacle). In general, inverter 108 may comprise any device capable of generating an AC signal of predetermined amplitude and frequency from inverter rail signal RL. Suitable inverters are described in U.S. Pat. No. 5,625,276 to Scott, et al.; U.S. Pat. No. 5,900,722 to Scott, et al.; and U.S. Pat. No. 5,886,504 to Scott, et al. For example inverter 108 suitably comprises a switched capacitor inverter of the type described in U.S. Pat. No. 5,900,722 in conjunction with FIGS. 27–29 of that patent. Specifically, referring to FIGS. 3A and 3B, inverter 108 suitably comprises an H bridge circuit 109 and a switched capacitance circuit 107. H Bridge circuit 109 comprises an H bridge configuration of switching devices 310 with cooperating firing circuits 312–318. H bridge 310 suitably comprises four power switches (each comprising a pair of parallel MOSFETs): top-left Q3/Q4, bottom-right Q9/Q10, top-right Q5/Q6, and bottom-left Q7/Q8. Firing circuits 312–318, responsive to respective control signals (TOP-L, BOT-R, TOP-R, and BOT-L) from controller 110 selectively render the switching devices conductive to effect current paths: (a) between ajuncture node 322 (e.g., signal RL) and one of system output terminals L1 or L2; and (b) between the common rail (system ground) and the other of system output terminals L1 or L2. High-side firing circuits 312 and 316 are preferably isolated and low-side firing circuits 314 and 318 are preferably non-isolated. Firing circuits 312–318 are suitably operated using negative logic, i.e., the switches of H bridge 310 are normally conductive and are rendered non-conductive by a positive control signal. For example, the gates of power switch Q3/Q4 are biased to render power switch Q3/Q4 conductive in the absence of a positive logic control signal TOP-L. When a positive logic control signal TOP-L is applied, transistor Q1 is rendered conductive, pulling the gates of power switch Q3/Q4 to ground and rendering it non-conductive.

A simulated sine wave may be produced by alternately generating switching signals: (a) TOP-L and BOT-R; and (b) TOP-R and BOT-L. The RMS magnitude of the voltage of signal ACOUT may be controlled by the inclusion of a "dead time" between turning off one pair of switches (e.g., Q3/Q4 and Q9/Q10) and then turning on the opposing pair of switches (e.g., Q6/Q5 and Q7/Q8). Control of the dead time in relationship to the voltage magnitudes provides an RMS voltage magnitude approximately equal to that of the desired sine wave. Switched capacitance circuit 107 selectively couples a capacitor C11 into the operative circuit during a predetermined portion of the output signal cycle to shape the waveform and render the rising and falling edges gradual, more closely simulating a sine wave, as opposed to sharp rising and falling edges normally occurring in a square wave type inverter. For example, switched capacitor C11 is effectively removed from the operative circuit during portions of the cycle corresponding to rising and falling edges of the output waveform. With switched capacitor C11 effectively removed, signal ACOUT provided across output terminals L1 and L2 is effectively the raw output of rectifier circuit 106, i.e., a full-wave rectified signal combining the outputs of the respective phases. The impedance apparent into the output terminals is effectively that of the alternator coils, i.e., an inductor at high frequency (e.g., 360 Hz). Accordingly, the rising edge of the output waveform is sloped, generally analogous to the rising edge of a true sine wave, as opposed to the abrupt rising edge of a square wave. A more complete description of a switched capacitor inverter is found in the aforementioned U.S. Pat. No. 5,886,504.

When system 100 is in the load demand mode, engine speed is controlled primarily in accordance with current drawn by the AC load at terminals L1 and L2. The voltage of signal RL provided by rectifier circuit 106 is generally indicative of engine speed. However, the voltage of signal RL (i.e., the rail voltage) is subject to regulation, for example, limiting it to a predetermined voltage (e.g., 125 volts). Accordingly, under certain circumstances, e.g., when engine speed exceeds the speed normally associated with the predetermined voltage, rail voltage does not accurately reflect engine speed. Without regulation, excessive engine speed would generate a higher rail voltage. As previously noted, floating voltage feedback circuit 118 provides unregulated signal VFB as an indicator of engine (alternator) speed and an accurate indicator of current drawn from winding W1 supplying the AC load. Floating voltage feedback signal VFB is coupled as a control signal to controller 110 and provides the primary control parameter during the load demand mode of operation.

Figure 4:
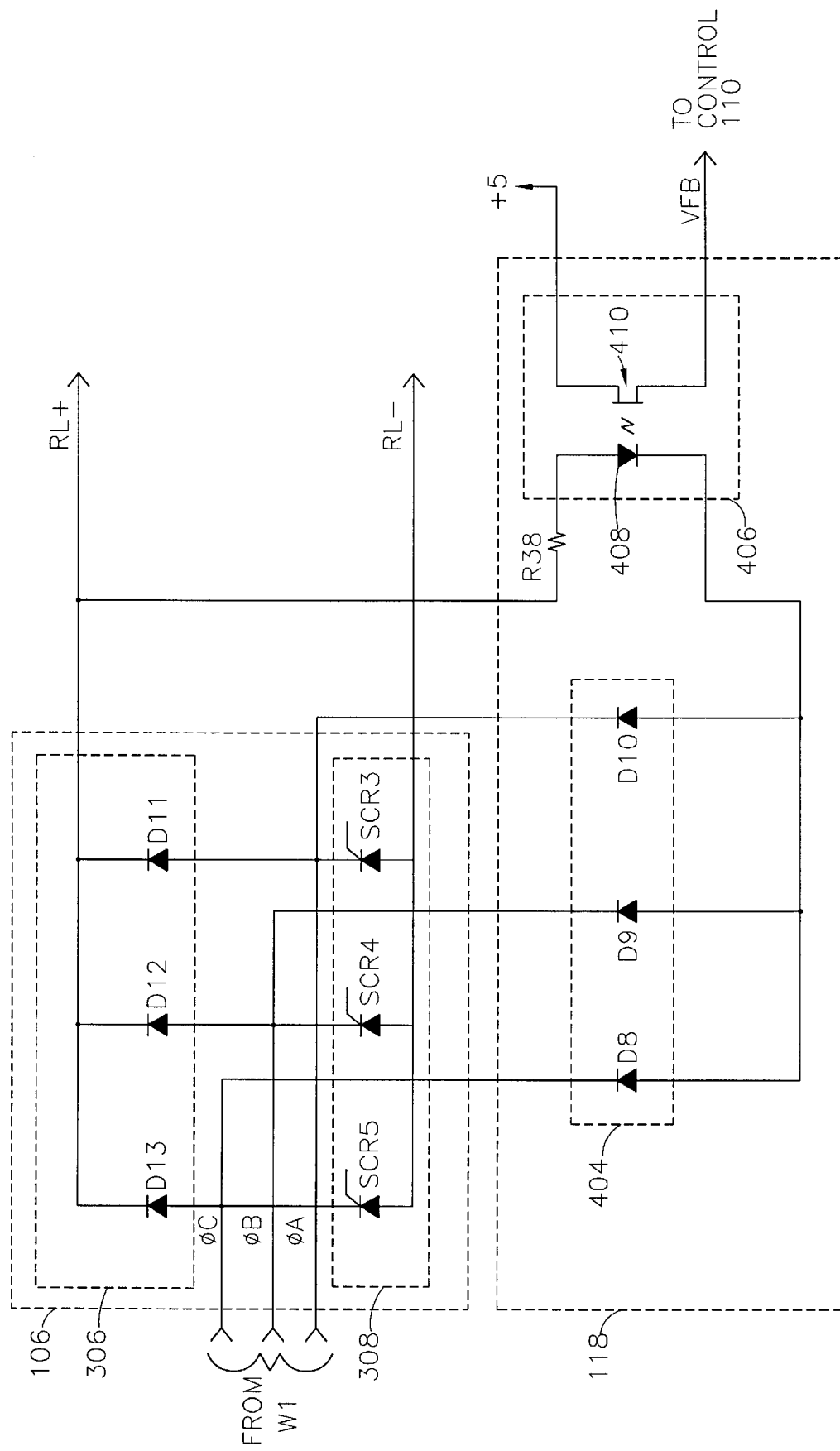
FIG. 4 is a schematic diagram of a rectifier circuit and voltage feedback circuit for the system of FIG. 1.

Referring to FIG. 4, floating voltage feedback circuit 118 suitably comprises a diode bridge rectifier 404 and a conventional analog opto-isolator 406. Rectifier 404 is suitably formed by a set of three diodes, D8, D9, and D10, cooperating with diodes 306 of rectifier circuit 106. The cathodes of diodes D8, D9, and D10 are connected to the respective phases of winding W1, the anodes of corresponding diodes 306, and the cathodes of SCRs 308.

Opto-isolator 406 is suitably a FET opto-coupler including an LED 408 and an output FET 410, such as a QT Optoelectronics Model H11-F3. Opto-isolator LED 408 is connected in series combination with a suitable resistor R38 between rail signal RL and the anodes of diodes 404 (i.e., across the rectifier bridge formed by diodes 306 and 404) to generate optical indicia of the voltage amplitude of signal RL from rectifier circuit 106. Opto-isolator FET 410 generates voltage feedback signal VFB indicative of the unregulated rail voltage (and thus actual engine speed) in an amplitude range compatible with an analog to digital converter in controller 110.

For any given throttle setting, the speed of engine 102 depends upon the load on inverter circuit 108. The electrical load on inverter circuit 108 is reflected as mechanical (magnetic) resistance to rotation of rotor 138 and thus engine shaft 126. Engine speed is thus indicative of load demand. As will be hereinafter discussed, voltage feedback signal VFB is applied to an analog to digital converter in controller 110. Controller 110 generates control signals to throttle control driver circuit 113 to effect throttle control in accordance with voltage feedback signal VFB. Thus, during the load demand mode, subject to the maximum engine speed established by ignition controller 116 and the maximum rail voltage established by the regulation of rectifier circuit 106, engine speed is adjusted in accordance with load demand.

In the battery charge/boost mode, subject to the maximum engine speed established by ignition controller 116, engine speed is controlled in accordance with the magnitude of signal DCOUT. As previously noted, battery charge supervision circuit 114 rectifies the AC signal from winding W2 to generate signal DCOUT suitable for charging a battery or jump-starting a vehicle. Preferably, circuit 114 also provides feedback signal BFB to controller 110 indicative of a magnitude of the DC output signal relative to a predetermined threshold value. More particularly, referring to FIG. 5, circuit 114 suitably comprises: a conventional diode bridge rectifier 502 having a respective leg corresponding to each phase of winding W2; a circuit 504 for generating indicia (feedback signal BFB) of the magnitude of DC output signal DCOUT relative to a threshold value: and, if more than one battery voltage is to be accommodated, a threshold selection switch 508.

In operation, a battery to be charged is connected across terminals B1 and B2. Rectifier 502 generates, from the output of winding W2, signal DCOUT for application to the battery. In the preferred embodiment, circuit 504 provides feedback signal BFB at a first logic level (e.g., one) when the magnitude of signal DCOUT exceeds a selected set point value and a second logic level (e.g., zero) when the magnitude of signal DCOUT does not exceed the selected set point value.

Circuit 504 suitably includes in series combination one or more zener diodes (e.g., D4) cooperating with an opto-coupler 509, a current limiting resistor R6, and, if desired, a trimming circuit 514. Opto-coupler 509 suitably comprises LED 510 and a phototransistor 512 cooperating such that light generated by current flow through LED 510 causes phototransistor 512 to be rendered conductive. Trimming circuit 514 suitably comprises a diode D3 and shunting zero ohm resistor (jumper) R3.

Circuit 504 includes a node 516 between terminals B1 and B2. In general, a zener diode (e.g., D4) having a break-over voltage in accordance with the desired battery voltage, is connected in series combination between node 516 and ground with LED 510, resistor R6, and trimming circuit 514. If only one battery voltage is to be accommodated, node 516 is suitably connected directly to battery terminal B1. If multiple battery voltages are to be accommodated, selection switch 508 and additional zener diodes (e.g., D28) are interposed between battery terminal B1 and node 516. As will be discussed, selection switch 508 selectively connects one or more additional zener diodes into the series circuit with LED 510 to vary the break-over voltage of the series combination.

The cumulative break-over voltage of the series circuit is chosen in accordance with a predetermined set point (the desired output voltage) associated with the selected battery voltage. So long as the DC output voltage does not exceed the set point value, no current flows through LED 510. Transistor 512 is thus non-conductive and the emitter thereof is pulled to ground through a resistor R57. Consequently, battery feedback signal BFB is ground (e.g., a logic zero). However, when the DC output voltage exceeds the set point value, the zener diode(s) are rendered conductive, current flow is established through LED 510, and transistor 512 is rendered conductive, bringing battery feedback signal BFB high (e.g., a logic one). As will be described, battery feedback signal BFB is applied as a control signal to controller 110, which, when in the charge/boost mode, generates throttle control signals to control engine speed accordingly.

If multiple battery voltages are to be accommodated, different set points are established, e.g., through selective connection of one or more additional zener diodes into the series combination connected across terminals B1 and B2. The break-over voltage of diode D4 in circuit 504 is suitably chosen in accordance with the lowest battery voltage to be accommodated. Switch 508 connects node 516 to battery terminal B1 directly if the lowest voltage is selected, or, if a higher voltage is selected, through an additional zener diode (e.g., D28) effectively connecting the additional zener diode into the series combination with LED 510. For example, where a 24 volt system is to be charged or jump started, operation of selection switch 508 introduces zener diode D28 having a nominal break-over voltage of 14 volts into series combination with zener diode D4 having a nominal break-over voltage of 12 volts. Thus, the set point is established at approximately 28 volts (nominally 27.5 volts). Operating current will not flow through LED 510 until the voltage of signal DCOUT exceeds approximately 28 volts. On the other hand, if a 12-volt system is to be charged or jump started, selection mechanism 508 shunts zener diode D28 out of the series combination. Operating current will now flow through LED 510 when the voltage of signal DCOUT exceeds approximately 14 volts.

It is desirable to use relatively low precision zener diodes. Zener diodes having a 5% tolerance are considerably less expensive than 1% or 2% components. However, the actual break-over voltage of a nominal 12-volt zener diode may vary from the nominal value by as much as 0.6 volts. Use of relatively inexpensive low precision zener diodes can be readily accommodated through use of trimming circuit 514. In production, zero ohm resistor (jumper) R3 initially shunts diode D3 out of the series combination. If is determined that the actual break-over voltage of zener diodes D4 and/or D28 is below rated nominal values, resistor R3 can be severed to place diode D3 in the operative circuit to increase the set point value by the voltage drop across diode D3 (e.g., 0.6 volt). Such a trimming process is particularly advantageous in that it is readily automated.

Control of the DC output voltage through a feedback loop is particularly economical wherein engine speed is adjusted in accordance with the DC output voltage magnitude. For example, the throttle setting may be increased by one unit when the DC output voltage magnitude is below the predetermined threshold and decreased by one unit when the DC output voltage magnitude is above the predetermined threshold. However, in some instances, such as when an attempt is made to charge an open circuit battery, runaway can occur. In addition, engine 102 has a finite response time to changes in throttle setting. It can be important to limit transient surges in the DC output voltage. For example, vehicle electronics are particularly susceptible to transient high voltages. Voltages in excess of 18 volts can cause damage to the electronic components of, for example, the vehicle emissions system, ignition, and fuel injection/carburetor. In the preferred embodiment, a safeguard is provided by limiting engine speed as discussed above with reference to ignition controller 116 when the DC output voltage magnitude exceeds a predetermined threshold.

Figure 6:
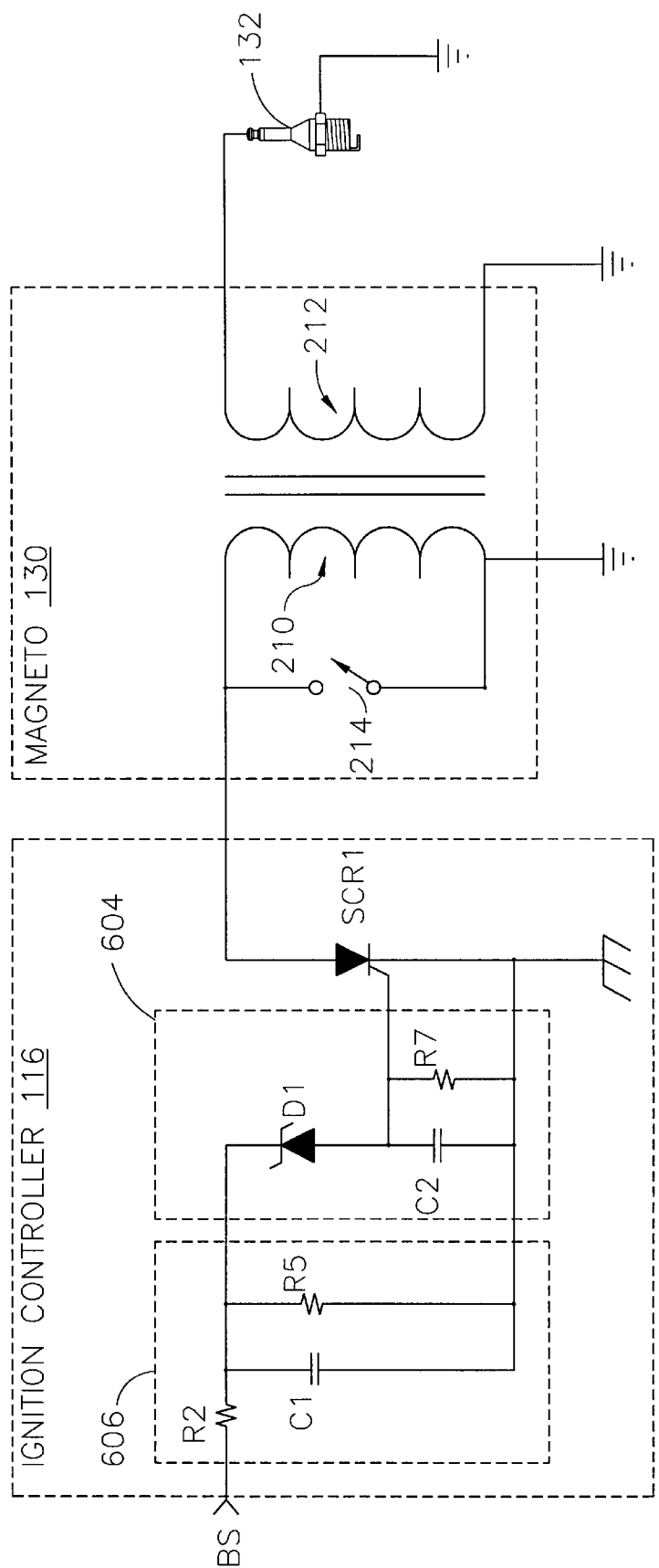
FIG. 6 is a schematic diagram of an RPM limiter circuit for the system of FIG. 1.

More particularly, RPM limiting is suitably employed as a system control mechanism. For example, upon detection of predetermined conditions (e.g., battery charge voltage exceeding a predetermined voltage), spark voltage is suitably attenuated to smoothly limit engine RPM to a predetermined limit (e.g., 7,000 RPM). RPM limiting is advantageously employed to simplify control of the system for governing the voltage on battery charge terminals, limiting transients on the inverter bus (i.e., signal RL), and facilitating load demand throttle control by compensating for the limited response time of the throttle control. Referring now to FIG. 6, ignition controller 116 suitably comprises: a switching device (e.g., SCR1) disposed to selectively ground primary winding 210 of magneto 130; a suitable triggering circuit 604; and, a suitable filter 606 for smoothing the output of rectifier 502.

Triggering circuit 604 generates a triggering pulse to SCR1 when the voltage across terminals B1 and B2 exceeds a predetermined level. Triggering circuit 604 is effectively connected between battery terminals B1 and B2, in series connection with filter 606, and, if utilized, selection switch 508 in battery charger supervision circuit 114. Triggering circuit 604 suitably comprises a zener diode D1, a resistor R7, and capacitor C2. The cathode of zener diode D1 is connected to filter 606 and the anode is connected to: (a) the gate of SCR1, and (b) ground through the parallel combination of capacitor C2 and resistor R7. Capacitor C2 and resistor R7 provide protection for SCR1 and prevent misfiring. When zener diode D1 is rendered conductive, (i.e., its break-over voltage is exceeded) current is applied to the gate of SCR1, and SCR1 is enabled. Accordingly, when a sufficient voltage is induced in magneto primary coil 210, SCR1 is rendered conductive to operate as a shunt across switch 214. SCR1 commutates off when the current induced in primary coil 210 drops below the holding current of the SCR.

The break-over voltage of zener diode D1 corresponds to the maximum voltage permitted for the selected battery voltage (e.g., 16 volts for a 12-volt battery system). If multiple battery voltages are to be accommodated, the break-over voltage of diode D1 is suitably chosen in accordance with the lowest battery voltage to be accommodated. Additional zener diodes (e.g., D28) if any, interposed between node 516 and battery terminal B1 by selection switch 508 also contribute to the break-over voltage. For example, where a 24-volt system is selected to be charged or jump started, selection switch 508 connects zener diode D28 (having a nominal break-over voltage of 14 volts) between node 516 and terminal B1. Thus, the break-over voltage is established at approximately 30 volts. Current will not flow through zener D1 until the voltage magnitude of signal DCOUT exceeds approximately 30 volts.

Operation of a shunt across switch 214 has the effect of attenuating (reducing the amplitude of) the voltage that is induced in magneto secondary coil 212 by the magnetic interaction of secondary coil 212 with fly wheel 202 (FIG. 2), primary coil 210, and switch 214. The attenuated secondary voltage prevents optimal operation of spark plug 132 and therefore prevents engine 102 from operating at full efficiency. Complete combustion of the fuel does not occur. Incomplete combustion limits efficiency and power, and thus limits RPM.

Figure 7:
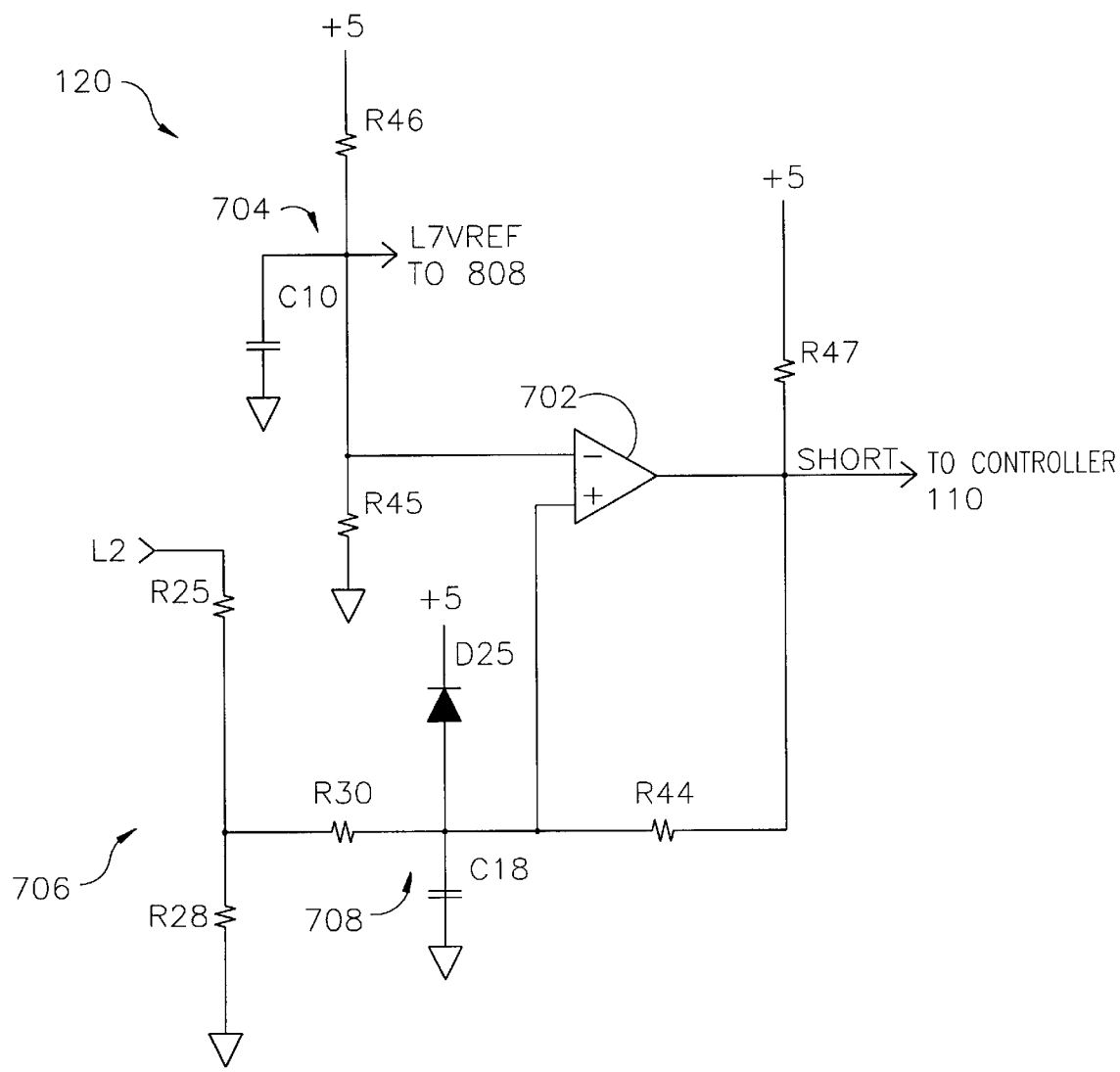
FIG. 7 is a schematic diagram of a short circuit detector for the system of FIG. 1.

As previously mentioned, short circuit detector 120 provides a signal to controller 110 indicative of a short circuit condition across terminals L1 and L2. More specifically, short circuit detection circuit 120 preferably compares the voltage at one of the AC output terminals (e.g., L2) with a predetermined threshold value. The threshold value suitably corresponds to a relatively high current (e.g., in the range of 60 to 70 amps). If the voltage at terminal L2 exceeds the threshold value during a portion of the AC cycle when the low-side power switch associated with that terminal would normally be conductive, a short circuit across terminals L1 and L2 is indicated. For example, if the voltage at terminal L2 (i.e., the source-drain voltage across bottom-right power switch Q9/Q10) exceeds a certain level during a portion of the AC cycle when that power switch is conductive, a short is indicated. Referring now to FIG. 7, short circuit detection circuit 120 suitably comprises a comparator 702, a reference voltage generator 704 (R46, C10, and R45), a voltage divider 706 (R25 and R28), and a clipping filter 708 (R30, C18, and D25). Reference voltage generator 704 provides a reference voltage (e.g., 1.7 volts) to the negative input of comparator 702. Voltage divider 706 divides down the voltage at terminal L2 by a predetermined ratio (e.g., one half). Filter 708 filters the divided down voltage and clips its amplitude to a predetermined maximum acceptable level (e.g., 5 volts). The output of filter 708, indicative of the voltage at terminal L2, is applied to the positive input of comparator 702. Under normal operating conditions, the voltage applied to the positive input of comparator 702 is less than the reference voltage during the relevant portion of the AC cycle. Accordingly, output signal SHORT of comparator 702 is normally low during the relevant time period. On the other hand, if a short circuit causes an abnormally high source-drain voltage across bottom-right power switch Q9/Q10 the voltage applied to the positive terminal of comparator 702 will exceed the reference voltage and signal SHORT goes high. As will be discussed, controller 110 selectively monitors signal SHORT, and effectively disables inverter 108 when a high level signal is detected during the relevant time period.

Operation of various components of system 100 (e.g., power switches of H bridge 310) with supply voltages below a predetermined minimum is potentially damaging to those components. Accordingly, it is desirable that operation be inhibited until the supply voltages reach a predetermined magnitude. Since the supply voltages are generated by interaction of the rotor with control winding WC, supply voltages below the safe magnitude correspond to particularly low engine speeds. Accordingly, low voltage regulation/disable circuit 124 not only cooperates with control winding WC to generate various regulated supply voltages to the electronic components of system 100, but also generates a control signal LVD to controller 110 indicative of low voltage conditions, for example, when engine speed is too low to generate the voltages necessary to power the electronic components. Controller 110, in effect, inhibits the operation of system 100 until an operating condition is attained that is safe for the various components of the system.

Figure 8:
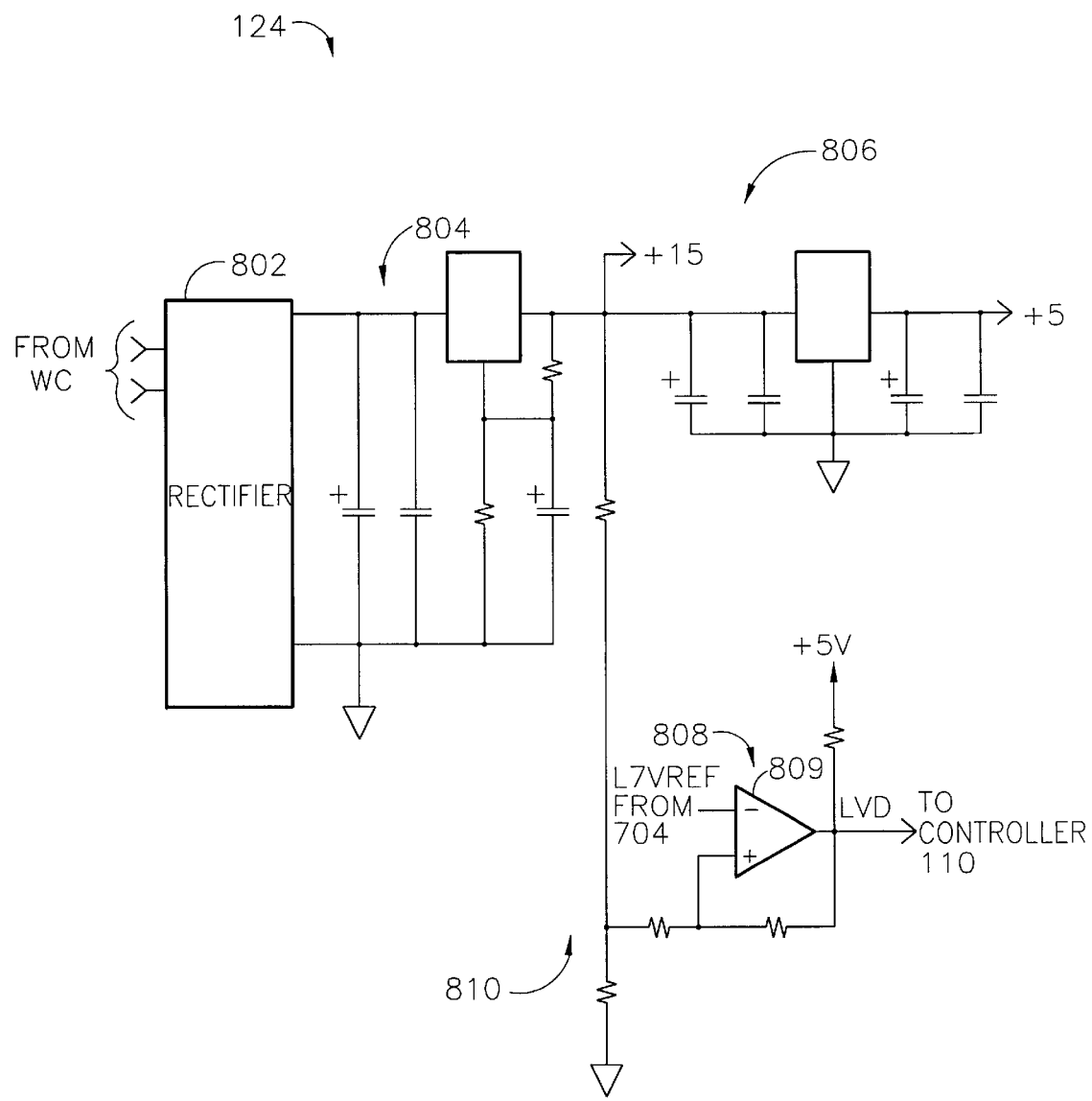
FIG. 8 is a schematic diagram of a low voltage regulation/disable circuit for the system of FIG. 1.

Referring now to FIG. 8, low voltage regulation/disable circuit 124 suitably comprises: a conventional rectifier 802 cooperating with control winding WC; conventional voltage regulators 804 and 806 for generating first and second regulated supply voltages (e.g., 15 volts and 5 volts respectively); and a comparator circuit 808. Comparator circuit 808 compares a signal indicative of the regulated 15-volt supply voltage to a predetermined level (e.g., 1.7 volts suitably generated by reference voltage generator 704 in short circuit detector 120). More specifically, a voltage divider 810 divides down the regulated supply voltage by an appropriate ratio (e.g., by a factor of 7.7). The voltage indicative of the supply voltage is applied to the positive input of comparator 809. The reference voltage (e.g., 1.7 volts), indicative of a minimum acceptable supply voltage, is applied to the negative input of comparator 809. Under acceptable operating conditions, the voltage applied to the positive input is greater than the reference voltage. Accordingly, under acceptable conditions, signal LVD provided by comparator 809 is high. When the supply voltage is too low, the voltage applied to the positive input is less than the reference voltage and output signal LVD of comparator 809 is low. Controller 110 monitors signal LVD and effectively disables the relevant portions of system 100 during periods when signal LVD is low.

Figure 9:
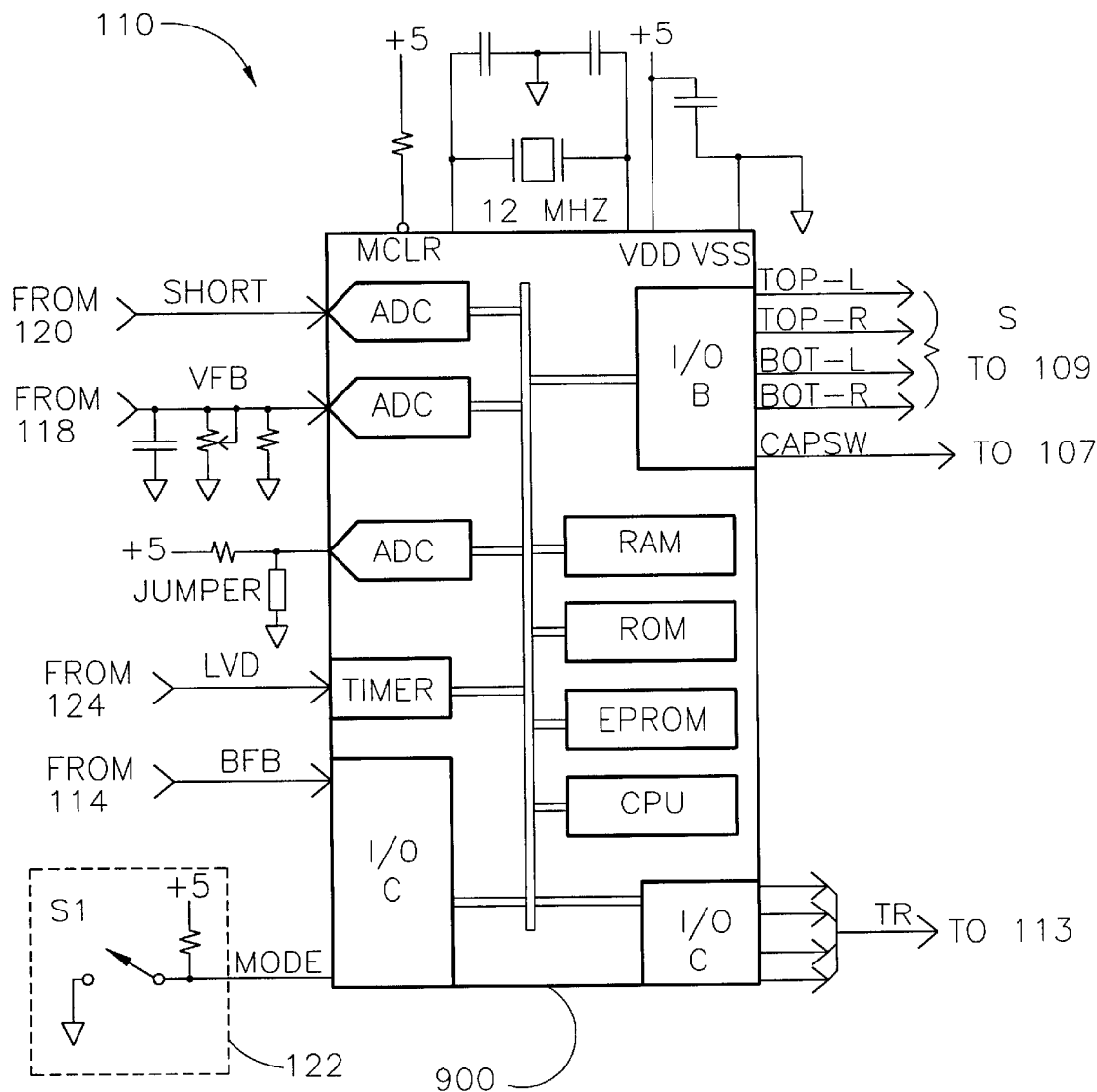
FIG. 9 is a schematic diagram of a controller circuit for the system of FIG. 1.

As previously noted, controller 110 provides suitable control signals to the various components of system 100. Controller 110 may include any device capable of providing suitable control signals to the various components of system 100. Referring to FIG. 9, controller 110 preferably comprises a microcomputer 900, for example, a Microchip type PIC 16C72 microcontroller which incorporates an internal read only memory (e.g. an electronically programmable memory or EPROM), a random access memory (RAM), an analog-to-digital (A/D) converter, and both analog and digital input/output (I/O) facilities.

Microcomputer 900 receives input signals and provides output signals as described in Table 1. An exemplary implementation includes signal pin assignments described in Table 2.

TABLE 1

| Signal | Type | Description |
| --- | --- | --- |
| BFB | Digital (1 bit) | From battery charger supervision circuit 114. When asserted (e.g. logic high), the voltage magnitude of signal DCOUT is above a threshold value. When not asserted (e.g., logic low), the voltage magnitude of signal DCOUT is less than or equal to the threshold value. |
| VFB | Analog | From floating voltage feedback circuit 118. Indicates the voltage magnitude of rail signal RL which varies with engine RPM and AC load. |
| LVD | Digital (1 bit) | From low voltage detector 124. When asserted (e.g., logic high), the voltage magnitude of signal +15 VDC is above a threshold minimum value. When not asserted (e.g., Togic low), the voltage magnitude of signal +15 VDC is less than or equal to the threshold minimum value. |
| SHORT | Digital (1 bit) | From short circuit detector 120. When asserted (e.g., logic high) the voltage magnitude of signal ACOUT at terminal L2 is above a threshold value, indicating a high current, probably short circuit, condition. When not asserted (e.g., logic low) a short circuit condition is not indicated. |
| MODE | Digital (1 bit) | From mode selection circuit 122. When asserted (e.g., logic high), operation of system 100 proceeds in load demand mode. When not asserted (e.g., logic low), operation proceeds in battery charge/boost (e.g., jump-start) mode. |

TABLE 1-continued

| Signal | Type | Description |
|---|---|---|
| CAPSW | Digital (1 bit) | To switched capacitance circuit 107. Selectively couples additional capacitance to shape the waveform of signal RL. |
| S { TOP-R TOP-L BOT-R BOT-L | Digital (4 bits) | To inverter circuit 108. Each signal controls a firing circuit for a respective power switch of H bridge 310. |
| TR | Digital (4 bits) | To throttle control driver 113. Binary coded signal directs extent of throttle position. |

TABLE 2

| Pin | Function | I/O | Description |
|---|---|---|---|
| 1 | MCLR* | In | Not used |
| 2 | AN0 | In | Not used |
| 3 | AN1 | In | VFB (A/D converter input) |
| 4 | AN2 | In | Ground through jumper |
| 5 | AN3 | In | Not used |
| 6 | T0CKI | In | LVD (1-bit input or interrupt) |
| 7 | AN4 | In | SHORT (A/D converter input) |
| 8 | VSS | In | ground |
| 9 | OSC | In | crystal oscillator circuit |
| 10 | OSC | In | crystal oscillator circuit |
| 11 | RC0 | In | MODE |
| 12 | RC1 | In | BFB |
| 13 | RC2 | In | Not used |
| 14 | RC3 | In | Not used |
| 15 | RC4 | Out | TR1 |
| 16 | RC5 | Out | TR2 |
| 17 | RC6 | Out | TR3 |
| 18 | RC7 | Out | TR4 |
| 19 | VSS | In | ground |
| 20 | VDD | In | +5 volts |
| 21 | RB0 | In | Not used |
| 22 | RB1 | Out | BOT-L |
| 23 | RB2 | Out | BOT-R |
| 24 | RB3 | Out | TOP-L |
| 25 | RB4 | Out | TOP-R |
| 26 | RB5 | Out | CAPSW |
| 27 | RB6 | In | Not used |
| 28 | RB7 | In | Not used |

Microcomputer 900 controls the operation of system 100 by executing a predetermined sequence of steps for: (a) generating the control signals CAPSW and S to effect operation of switched capacitance circuit 107 and inverter circuit 108; (b) testing the state of various input signals such as MODE, SHORT, and LVD, (accordingly, executing predetermined protection subroutines if called for); and (c) testing the state of VFB or BFB depending upon mode selection circuit 122 (accordingly, executing appropriate subroutines to generate control signals TR to throttle control driver circuit 113). Microcomputer 900 also institutes specified process sequences in response to (and upon the occurrence of) predetermined conditions or interrupts. Any suitable gram for effecting such operations may be employed. An exemplary program will be described in conjunction with FIGS. 10–18.

In connection with execution of one or more programs discussed above, microcomputer 900 maintains in memory indicia of a sequence of instructions, various variables, and constants. Exemplary variables and constants include those listed in Table 3.

TABLE 3

| Variable/ Constant/Register | Description |
|---|---|
| BFB | Flag corresponding to signal BFB. |
| BIT_HOLD_INI | A flag indicating that throttle adjustments will be delayed in anti-hunting mode. |
| BIT_HUNT | A flag indicating currently in anti-hunting mode. |
| BIT_MOVE_DONE | A flag indicating throttle adjustment accomplished in anti-hunting mode. |
| BIT_REC | A flag indicating whether the last recorded value of VDC was below the dead band. |
| CAP_IN | Flag enabling operation of switched capacitance circuit 107. Switched capacitance circuit 107 is disabled if CAP_IN is 0. |
| CAP_OFF | Count corresponding to the point in the AC output half cycle when switched capacitance circuit 107 disconnects the capacitance from the operative circuit. |
| CAP_ON | Count corresponding to the point in the AC output half cycle when switched capacitance circuit 107 has connected the capacitance into the operative circuit. |
| CAP_SW | Bit used to generate control signal CAPSW provided to switched capacitance circuit 107 to connect and disconnect the capacitance in the operative circuit. |
| FAST_RATE_COUNT | Predetermined count indicative of time delay between successive changes to throttle corresponding to fast rate of throttle change. |
| FASTER_RATE_COUNT | Predetermined count indicative of time delay between successive changes to throttle corresponding to faster rate of throttle change. |
| H_CYCLE | Predetermined count corresponding to the duration of a half cycle of signal ACOUT. |
| HB_CNT | H Bridge Counter indicates the instantaneous phase of (e.g., number of 260 microsecond periods elapsed in) the present half cycle of signal ACOUT. |

TABLE 3-continued

| Variable/ Constant/Register | Description |
| --- | --- |
| HI_BRIDGE | Predetermined count corresponding to the point in the AC output half cycle when a high-side switch of H bridge 310 is turned off (e.g. Q4/Q3 or Q6/Q5 depending upon the polarity of the half cycle). |
| INI_HD_CNT1 | Counter for delay in anti-hunting mode. |
| INI_HD_CNT2 | Counter for delay in anti-hunting mode. |
| KILL_OC | A flag that, when raised, for example, by overcurrent detection, indicates engine 102 is to be stopped. |
| L_BRIDGE | Predetermined count corresponding to the point in the AC output half cycle when a low-side switch of H bridge 310 is turned off (e.g., Q9/Q10 or Q7/Q8 depending upon the polarity of the half cycle). |
| LVD | A flag that indicates an undervoltage condition corresponding to signal LVD. |
| MODE | Indicates desired control parameter (VFB or BFB). |
| NORMAL_RATE_COUNT | Predetermined count indicative of time delay between successive changes to throttle corresponding, to normal rate of throttle change. |
| PRE_KILL_WAIT1 | Counter #1 in time delay loop 1205 of overcurrent protection subroutine. |
| PRE_KILL_WAIT2 | Counter #2 in time delay loop 1205 of overcurrent protection subroutine. |
| PRE_KILL_WAIT3 | Counter #3 in time delay loop 1140 of short circuit protection subroutine. |
| PRE_KILL_WAIT4 | Counter #4 in time delay loop 1140 of short circuit protection subroutine. |
| RATE_COUNTER | Down counter used to establish time delay between successive changes to throttle; used to determine rate of throttle change. |
| SC_CNT | Count indicative of the duration of a short circuit condition. |
| SC_KILL | A flag that, when raised for example by short circuit detection, indicates engine 102 is to be stopped. |
| SC_SIGN | Flag indicating that a short circuit condition has been detected during an earlier cycle. |
| SC_TIME_REF | Count indicative of duration of a short circuit condition. |
| SHORT | Flag corresponding to signal SHORT. |
| STEP_DOWN | A flag that indicates that the binary control code for motor 112 should decrease to close throttle mechanism 128. |
| STP_DLY_HUNT | Delay between throttle adjustments in anti-hunting mode. |
| SW_HP | Upper recorded value of the voltage swing in anti-hunting mode. |
| SW_HUNTING | The mid point of the voltage swing between recorded values of VDC in anti-hunting mode. |
| SW_LOW | Variable that tracks throttle position. |
| SW_LP | Lower recorded value of the voltage swing in anti-hunting mode. |
| TIME_OUT_HT1 | Counter for delay in anti-hunting mode. |

TABLE 3-continued

| Variable/ Constant/Register | Description |
| --- | --- |
| TIME_OUT_HT2 | Counter for delay in anti-hunting mode. |
| TL_HT_TIMES | Count of program cycles during anti-hunting mode. |
| TS_CNT1 TS_CNT2 TS_CNT3 | Counters count about 30 seconds before closing throttle 128 and stopping engine 102. |
| TS_STEP_DOWN | Counter to control the speed of closing throttle 128. |
| VDC | Variable corresponding to voltage of signal VFB. |
| VDC_HI, VDC_THI VDC_HI3, VDC_LO VDC_TLO, VDC_LO3 | Values that correspond to voltages used in connection with multi-window voltage regulation. |
| VDC_HI_HUNT | The upper limit of the anti-hunting band. |
| VDC_LO_HUNT | The lower limit of the anti-hunting band. |
| VDC_REF | Indicates an abnormally high voltage of signal VFB. |

Figure 10A:
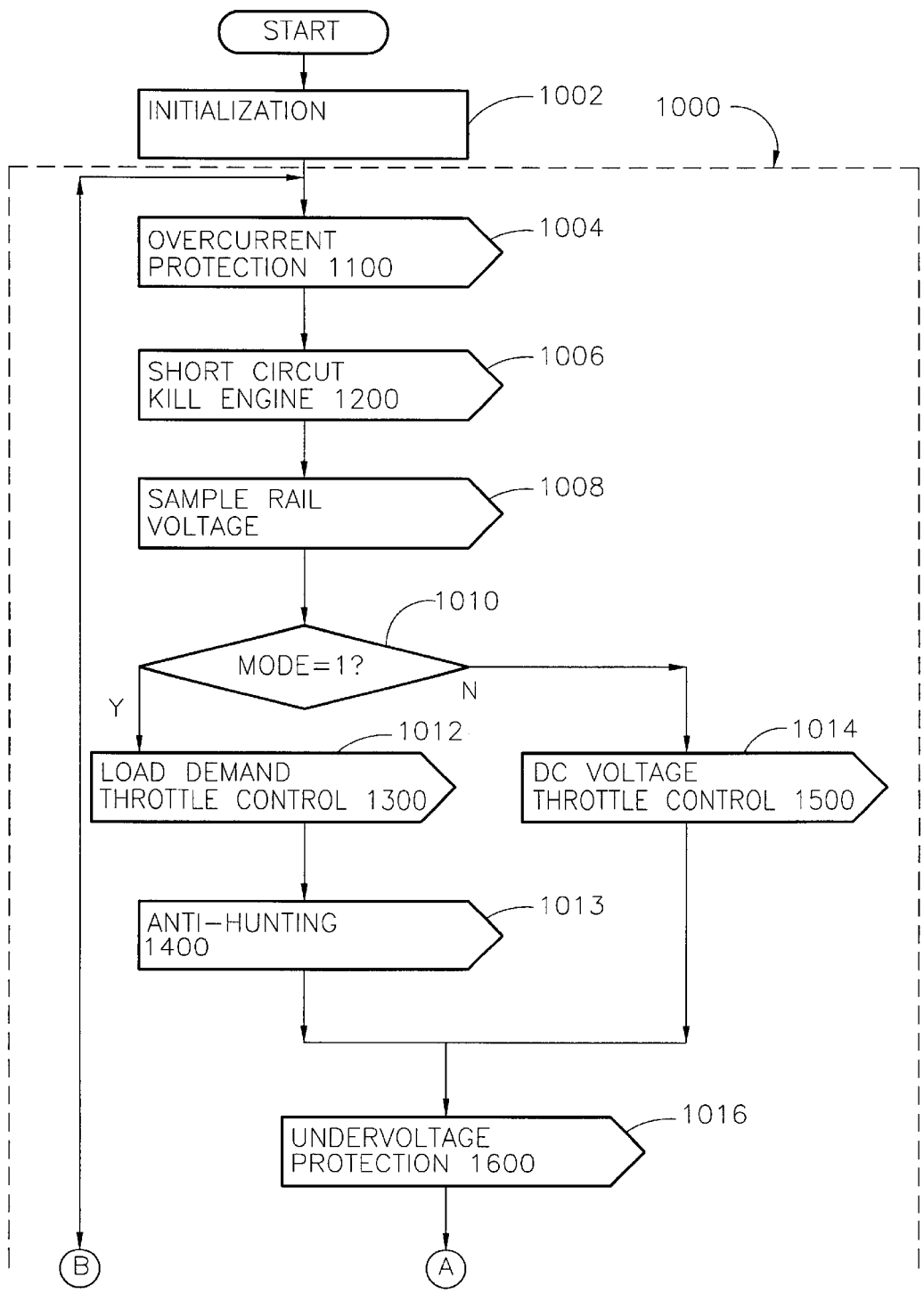
FIGS. 10A–B, 11A–C, 12, 13, 14A–D, and 15–18 present a flow chart for a method performed by a controller for the system of FIG. 1.
Figure 10B:
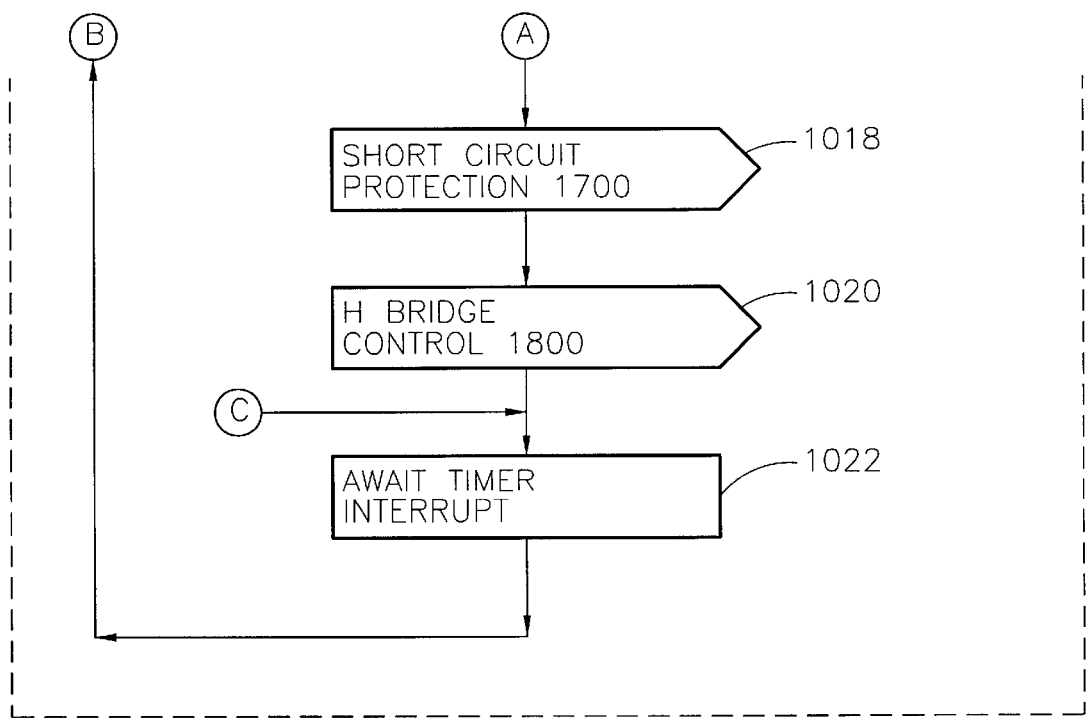
Figure 11A:
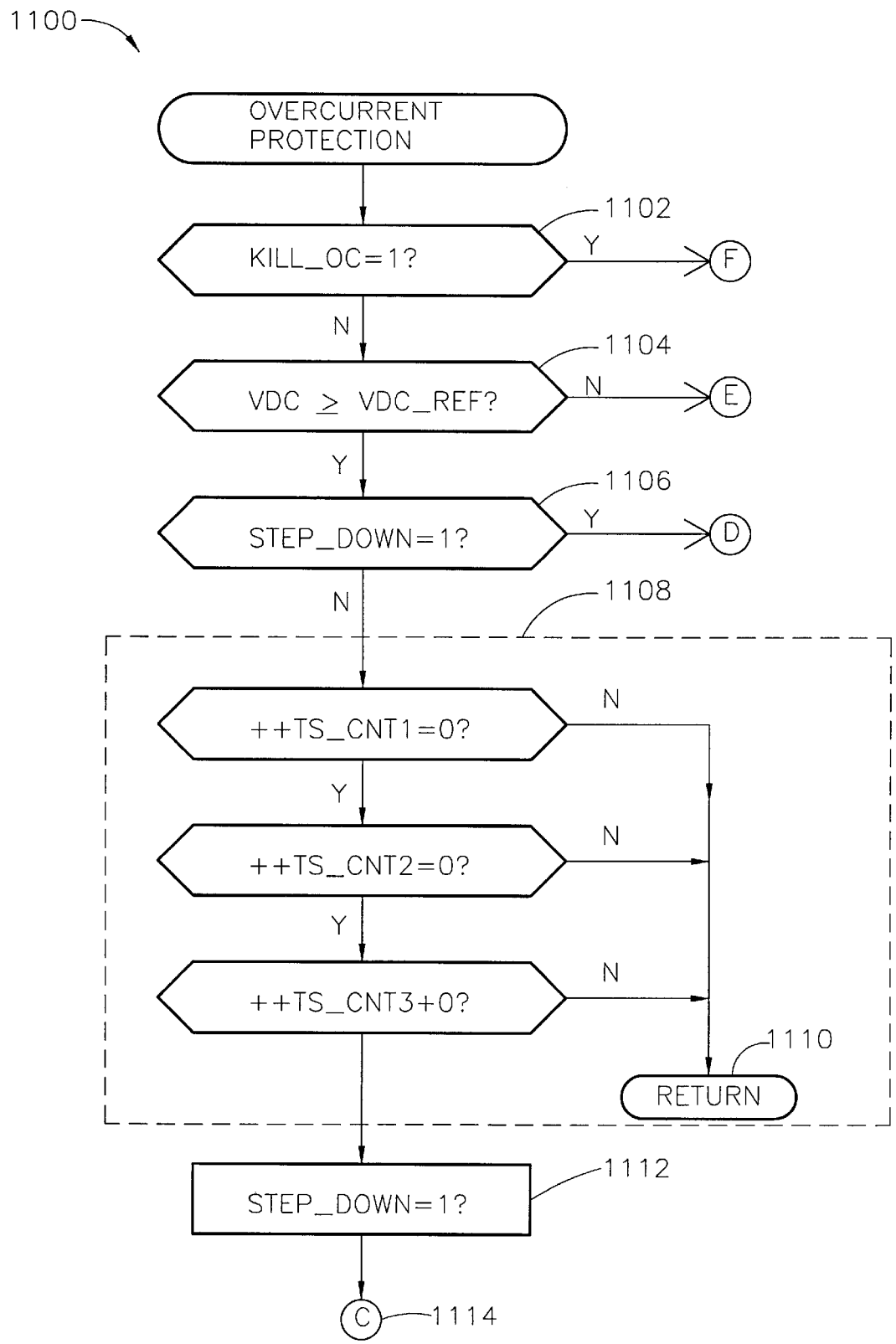
Figure 11B:
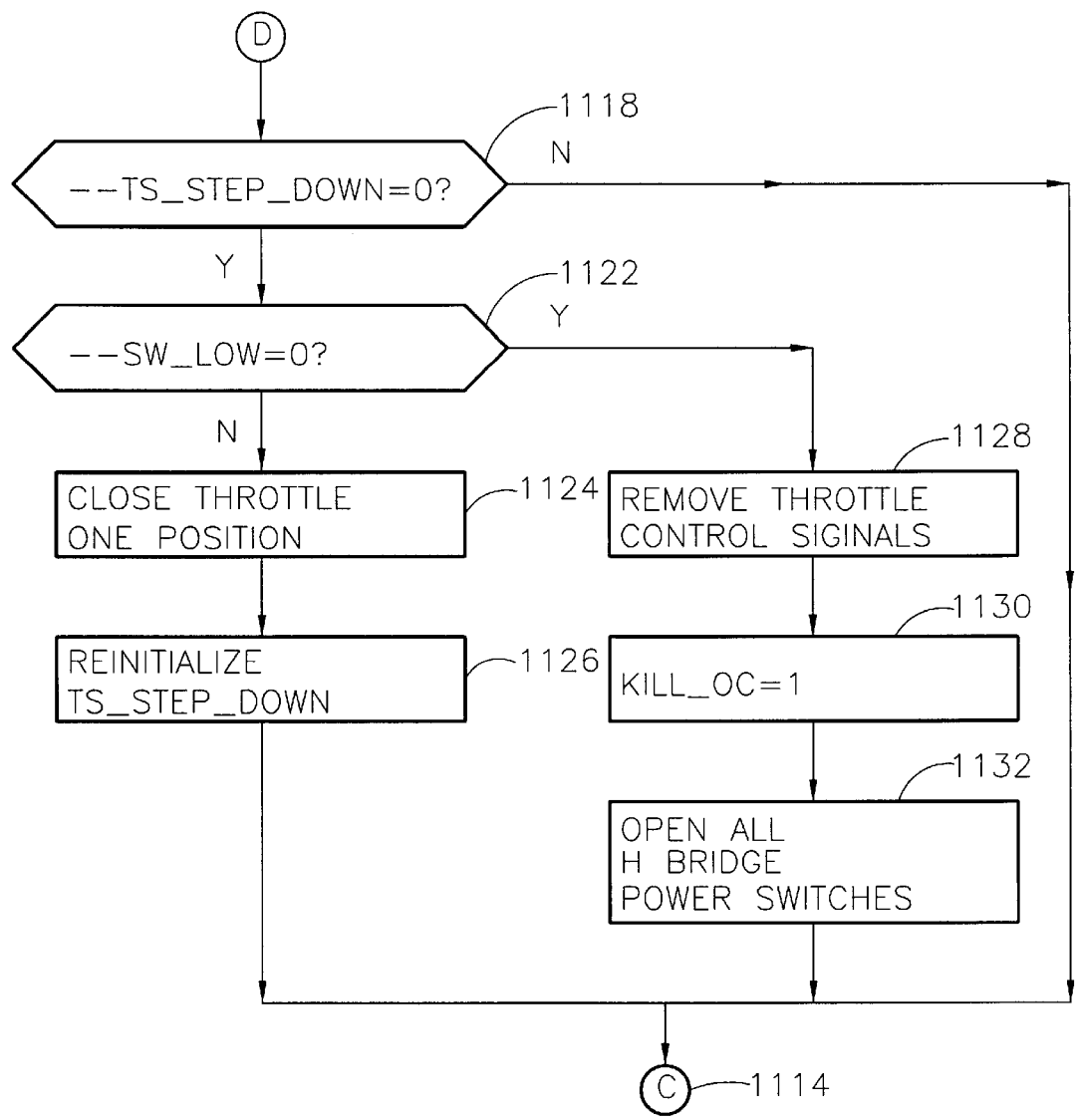
Figure 11C:
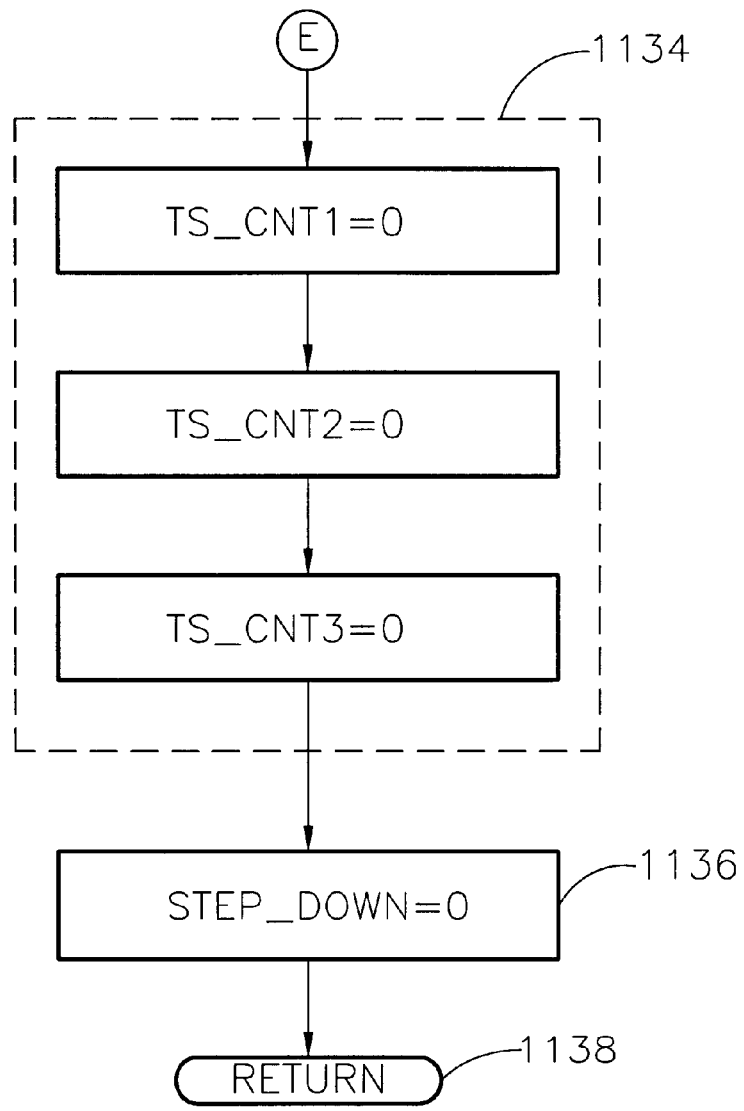
Figure 11D:
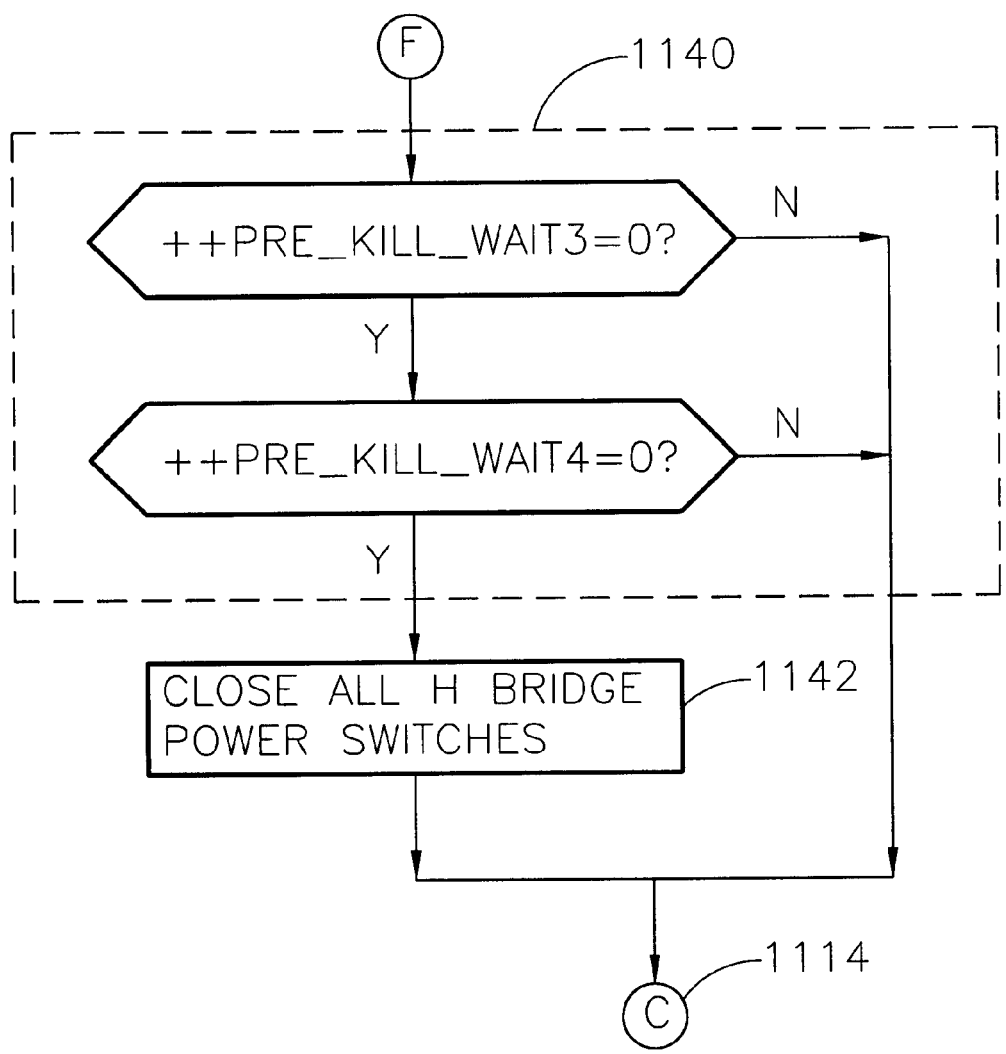

Referring now to FIG. 10, upon startup, microcomputer 900 executes a sequence of initialization operations (step 1002) for initializing port settings, variables (e.g., flags and counts set to zero), and buffers. Then, microcontroller 900 begins to repetitively execute a main loop 1000 in response to each periodic timer interrupt (e.g. every 260 microseconds). Each execution of main loop 1000 (steps 1004–1020) is herein called a program cycle.

Main loop 1000 in general effects operation of system 100 by: calling an overcurrent protection subroutine 1100 (step 1004); calling a short circuit kill engine subroutine 1200 (step 1006); sampling the analog signal VFB from floating voltage feedback circuit 118 (step 1008); determining the mode of operation (step 1010); calling either a load demand throttle control subroutine 1300 (step 1012) or a DC voltage throttle control subroutine 1500 (step 1014) depending upon the operator selected mode; calling an undervoltage protection subroutine 1600 (step 1016); calling a short circuit protection subroutine 1700 (step 1018); calling an H bridge control subroutine 1800 (step 1020); and then entering a no operation loop (step 1022) to await the next timer interrupt.

As will be further discussed in conjunction with FIG. 11, overcurrent protection subroutine 1100 determines whether or not an overcurrent condition (abnormally high current provision to a load) is present as indicated when the voltage of feedback signal VFB exceeds a predetermined voltage limit. If an overcurrent condition persists for a predetermined duration, the throttle setting is incrementally decreased. Decreasing the throttle setting may alleviate the overcurrent condition. In many instances, the overcurrent condition can be the result of a cold filament load and is ameliorated as the filament heats up. By temporarily decreasing the throttle setting, and thus decreasing the output current, the filament can be heated while staying within system output current limits. As the filament heats, its current draw decreases until full filament operation is achieved. If, however, the overcurrent condition persists to the point where the throttle is fully closed, the coils of the stepper motor (part of throttle control 112) are turned off and a flag is set to cause the system to initiate a shutdown sequence beginning in the next successive program cycle.

Assuming an overcurrent condition is not indicated, short circuit kill engine subroutine is executed (step 1006). As will be more fully discussed in conjunction with FIG. 12, if a sufficiently serious short circuit condition is found to exist, and certain preparatory actions were completed by short circuit protection subroutine 1700 in the previous program cycle (as indicated by a set flag $SC_{13}KILL$), system 100 is shut down. If no short circuit condition warranting shut down was earlier flagged, a return to main loop 1000 is effected.

Assuming that short circuit kill engine subroutine 1200 has not terminated due to a detected short circuit, microcomputer 900 samples voltage feedback signal VFB (step 1008). The mode selection indicator corresponding to signal MODE is tested (step 1010) and a selected throttle control subroutine is executed. If load demand mode is indicated (e.g., MODE=1), a subroutine for adjusting engine speed in accordance with load demand as indicated by signal VFB is executed (step 1012). If battery charge/boost mode is indicated (e.g., MODE=0), a subroutine for adjusting engine speed in accordance with DC output voltage as indicated by signal BFB is executed (step 1014). Suitable subroutines for feedback control of engine speed in accordance with load demand or DC output voltage will be described in conjunction with FIGS. 13 and 15, respectively. An anti-hunting subroutine 1400 is suitably called in connection with load demand control to accommodate peculiarities in the mechanical response of throttle 128 and engine 102.

After execution of the selected throttle control subroutine, undervoltage protection subroutine 1600 is executed (step 1016). As will be more fully discussed in conjunction with FIG. 16, the state of control signal LVD is tested. If the state of signal LVD indicates sufficient supply voltage (e.g., LVD is logic high), short circuit protection subroutine 1700 is executed (step 1018) and H bridge control subroutine 1800 is executed (step 1020) each returning to main loop 1000. If, however, signal LVD indicates an insufficient supply voltage (e.g., LVD is logic low), all power switches of H bridge 310 are opened and the next timer interrupt is awaited.

Figure 17:
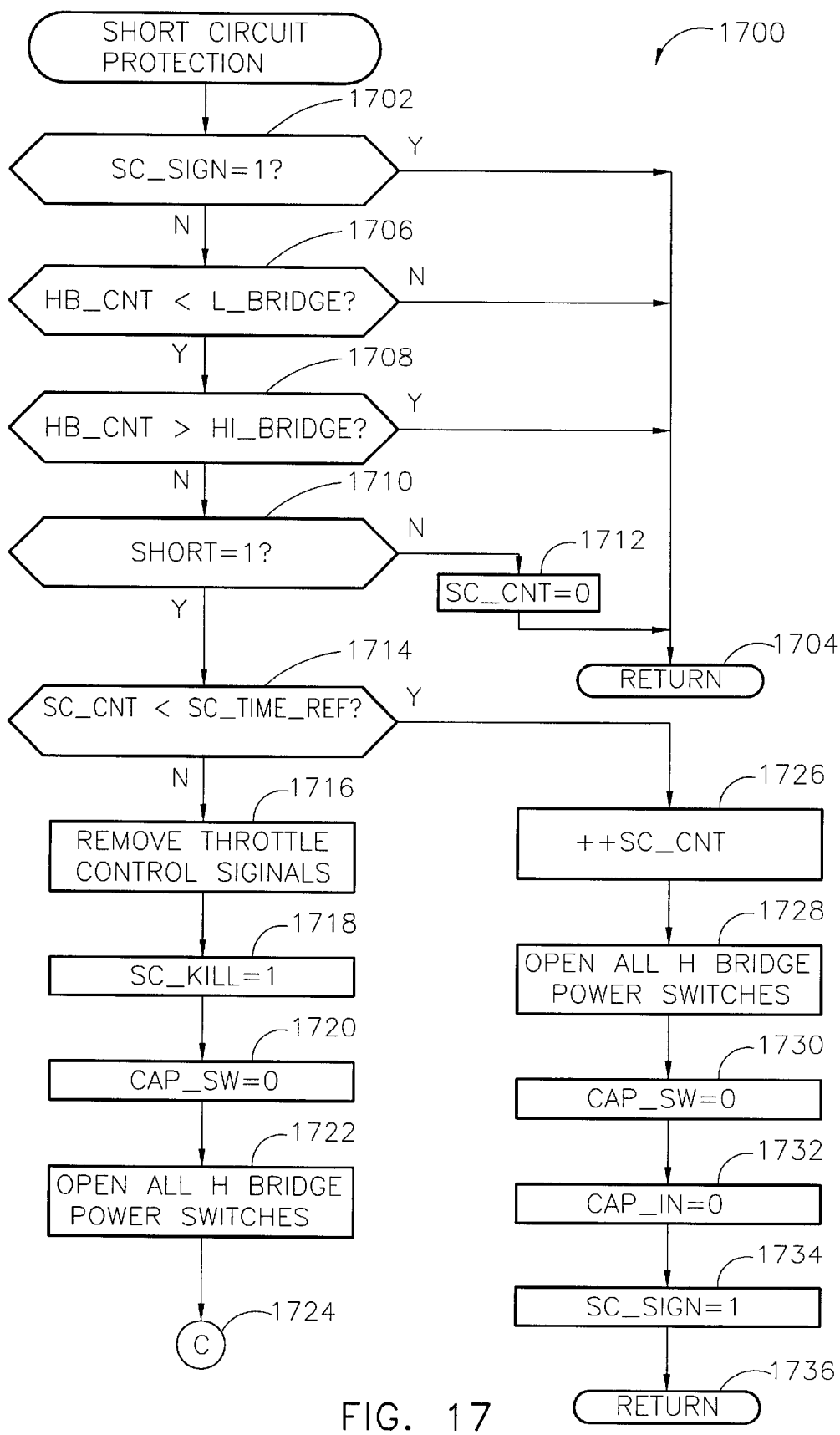

As will be more fully discussed in conjunction with FIG. 17, when short circuit protection subroutine 1700 is called (step 1018), signal SHORT from short circuit detector 120 is tested to determine whether or not a short circuit condition exists, and if so, whether it has persisted for a predetermined duration. If a short circuit condition is detected, all power switches of H bridge 310 are opened and switched capacitance circuit 107 effectively removes capacitance from the operative circuit. If a short circuit condition has persisted for the predetermined duration, steps are taken to put system 100 in a condition for shut down and flag SC_KILL is set to 1. The system is then shut down by short circuit kill engine subroutine 1200 during the next program cycle.

Figure 18:
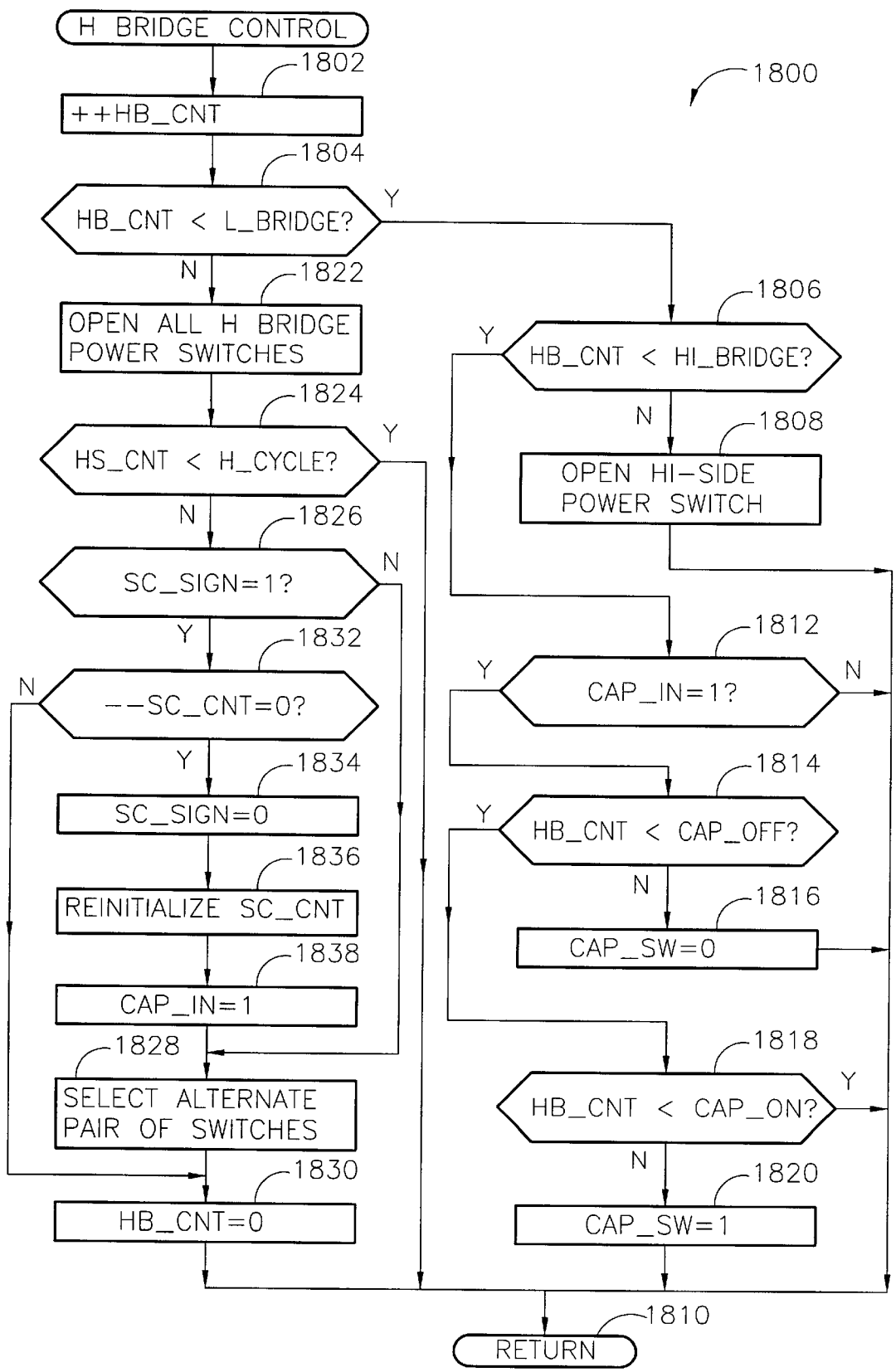

As will be more fully discussed in conjunction with FIG. 18, H bridge control subroutine 1800 is employed to generate control signals TOP-L, TOP-R, BOT-L, BOT-R, and CAPSW to inverter 108. In essence, count HB_CNT indicative of the instantaneous phase of signal ACOUT is maintained (e.g., number of 260 microsecond periods elapsed) and compared against reference counts corresponding to the points in the AC cycle when the respective power switches of H bridge 310 and switched capacitance circuit 107 are to be activated and deactivated to generate the desired output waveform. As the instantaneous phase count reaches the respective reference counts the appropriate control signals are generated and a return to main loop 1000 is effected. By alternately generating control signals (TOP-L, BOT-R) and (TOP-R, BOT-L), an approximated sine wave is produced. The RMS value of the signal may be controlled by the inclusion of a "dead time" between turning off one pair of power switches (e.g., by TOP-L and BOT-R) and turning on the opposing pair (e.g., by TOP-R and BOT-L). Control of the dead time in relationship to the voltage magnitudes provides an RMS value approximately equal to that of the desired sine wave. Switched capacitance circuit 107 selectively couples a capacitance into the operative circuit only during a predetermined portion of the AC cycle to shape (filter) the waveform and to render the rising and falling edges gradual, more closely approximating a sine wave as opposed to sharp rising and falling edges normally occurring in a square wave type inverter. In addition, lagging currents caused by highly inductive loads can be accommodated by rendering the operative high-side power switch (Q3/Q4 or Q5/Q6) non-conductive at a point in time corresponding to the beginning of the dead time in the desired voltage waveform, then after permitting continued current flow of lagging currents, turning off the operative low-side power switch (Q7/Q8 or Q9/Q10) so that all of the power switch circuits of H bridge 310 are thereafter non-conductive. If a short circuit condition was previously detected (as indicated by flag SC_SIGN) during the prior execution of short circuit engine kill subroutine 1200, H bridge operation is suspended. If the short circuit condition persists for a predetermined duration, the short circuit condition flag (SC_SIGN) is reset to zero, switched capacitance circuit 107 is re-enabled, and the alternate pair of H bridge power switches is enabled to resume operation.

After a return from H bridge control subroutine 1800 (step 1020), microcomputer 900 enters a no operation loop to await the next timer interrupt (step 1022), whereupon main loop 1000 is repeated.

As noted above, overcurrent protection subroutine 1100 is called (step 1004) from main loop 1000 to determine if an overcurrent condition exists and, if necessary, effect remedial measures. If an overcurrent condition persists for a predetermined period, the throttle setting is incrementally decreased to close throttle 128. If the overcurrent condition continues to persist to the point where the throttle is fully closed, the coils of the stepper motor (part of throttle control 112) are turned off and flag KILL_OC is set to cause the system to initiate a shutdown sequence beginning in the next successive program cycle. Referring now to FIG. 11, a suitable overcurrent protection subroutine is described. When overcurrent protection subroutine 1100 is called, flag KILL_OC is checked (step 1102) to determine whether or not an overcurrent condition was previously determined to require the engine to be shut down. Flag KILL_OC is set to zero during initialization (step 1002) and may be set in overcurrent protection subroutine 1100 only if the voltage of signal VFB exceeds a predetermined magnitude for more than a predetermined duration and throttle control apparatus 112 is maintaining throttle mechanism 128 in a fully closed condition.

Assuming that flag KILL_OC is not already set, variable VDC corresponding to signal VFB is compared (step 1104) against a reference value, VDC_REF, corresponding to an abnormally high voltage. If variable VDC is greater than or equal to reference VDC_REF, a determination is made as to whether or not the overcurrent condition has persisted for a predetermined duration (e.g., 30 seconds). More specifically, flag STEP_DOWN, indicative of lapse of the duration, is tested (step 1106). Assuming that the STEP_DOWN flag is not set, program cycles are counted in a three-tier procedure generally indicated 1108. Until a number of program cycles corresponding to the predetermined duration have occurred, returns to main loop 1000 are effected (step 1110). After the number of program cycles corresponding to the predetermined duration have occurred, flag STEP_DOWN is set (step 1112) and a jump (step 1114) is made to (step 1022) await the next timer interrupt.

Assuming that the overcurrent condition persists until the end of the predetermined period, the throttle setting is incrementally decreased (unless already fully closed). More specifically, if an overcurrent condition exists, and flag STEP_DOWN is set, count TS_STEP_DOWN is decremented and checked against 0 (step 1118). Count TS_STEP_DOWN is initially loaded with a count indicative of the time required to elapse between successive throttle setting changes to ensure sufficient time for the mechanical system to respond. If sufficient time has not elapsed, a jump (step 1114) is made (step 1022). Assuming, however, that sufficient time has elapsed, count SW_LOW, indicative of the position of the throttle, is decremented then checked against 0 (step 1122), indicative of a fully closed throttle. If the throttle is not already fully closed, appropriate signals are generated (step 1124) to throttle control driver 113 to close the throttle by one incremental position. Counter TS_STEP_DOWN is then reinitialized (step 1126) and a jump (step 1114) is made (step 1022) to await the next timer interrupt.

If, on the other hand, the throttle is fully closed (SW_LOW=0), steps are taken to prepare for shutting down system 100. All of the throttle control (stepper motor drive) signals are turned off (step 1128), flag KILL_OC is set (step 1130) so that engine shut off is initiated in the next program cycle, and all power switches of H bridge 310 are opened (step 1132). A jump (step 1114) is made to (step 1022) to await the next timer interrupt.

If the overcurrent condition is abated (VDC drops below VDC_REF) at any time before flag KILL_OC is set, the process ceases. The counters employed in procedure 1108 in connection with establishing the minimum duration of the overcurrent condition before adjusting the throttle are all reinitialized (step 1134), flag STEP_DOWN is reset (step 1136), and a return (step 1138)to main loop 1000 is effected.

If it is determined that flag KILL_OC is 1 (step 1102) and a predetermined delay has lapsed as indicated by two-tier procedure 1140 to ensure that no current is flowing in the winding of the throttle control stepper motor, all power switches of H bridge 310 are closed. Since the throttle is fully closed, simultaneously closing all power switches of H bridge 310 presents a sufficient load to stall engine 102. Until a number of program cycles corresponding to the predetermined delay have occurred, control passes to step 1114. After the number of program cycles corresponding to the predetermined delay have occurred, all power switches in H bridge 310 are closed (step 1142) and control passes to step 1114.

Figure 12:
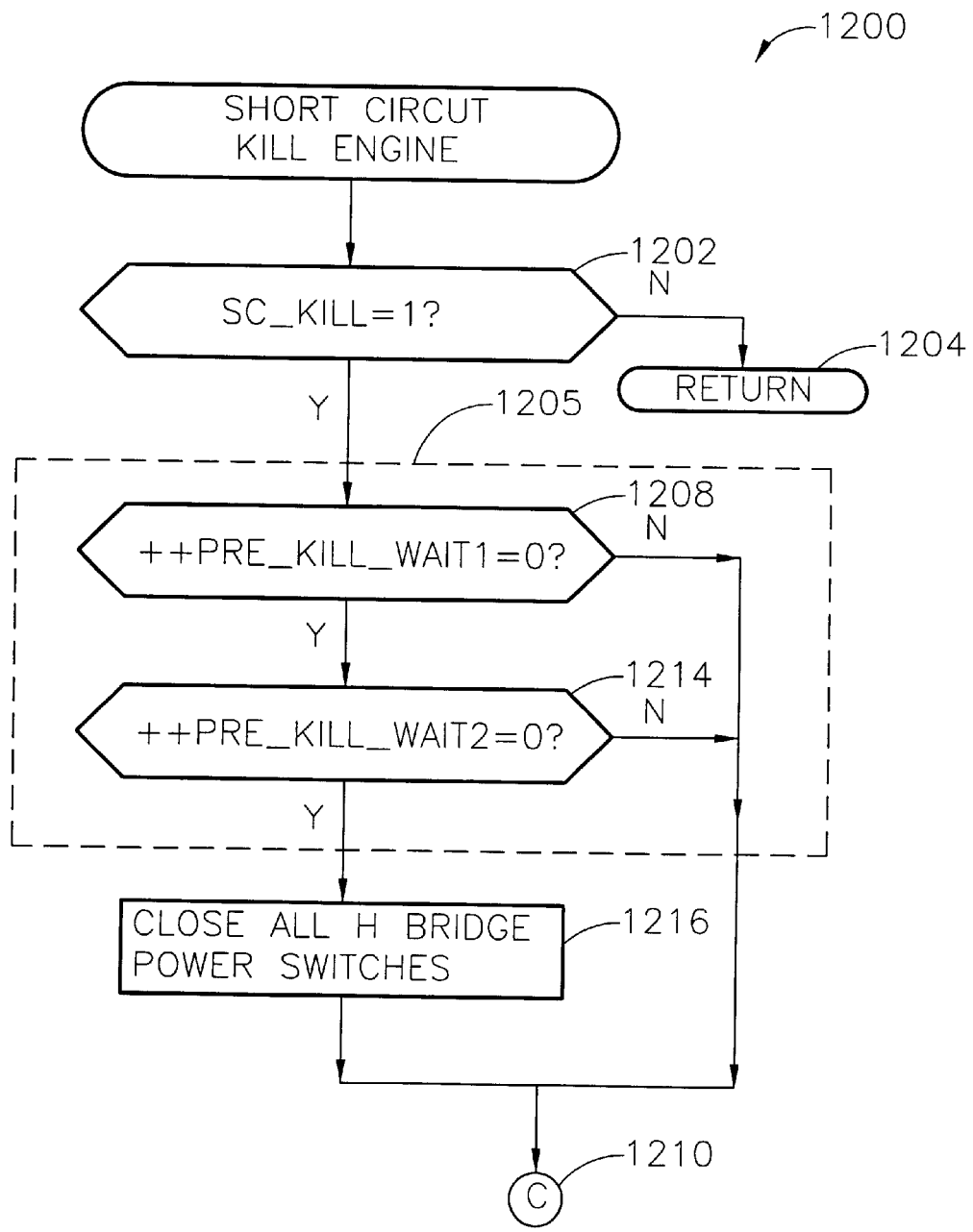

As previously noted, a short circuit engine kill subroutine 1200 is called (step 1006) from main loop 1000 to shut down system 100 if a sufficiently serious short circuit condition was earlier found to exist and certain preparatory actions were completed by short circuit protection subroutine 1700. Referring now to FIG. 12, when short circuit engine kill subroutine 1200 is called, flag SC_KILL is checked (step 1202). Flag SC_KILL, initialized to 0 (step 1002), is set after: (a) a short circuit condition has been detected by a previous execution of short circuit protection subroutine 1700; (b) all coils of the stepper motor (part of throttle control 112) have been turned off; (c) switched capacitance circuit 107 has been disabled; and (d) all power switches of H bridge 310 have been opened. If flag SC_KILL is not set, a return to main loop 1000 is effected (step 1204). Otherwise, a determination is made as to whether or not a predetermined delay has passed since flag SC_KILL was set to ensure that no current is still flowing in the coils of the stepper motor. Program cycles are counted by a two-tier procedure 1205. More specifically, count PRE_KILL_WAIT1 (as preset to a predetermined value during initialization (step 1002)) is decremented by 1 and tested against 0 (step 1208). If count PRE_KILL_WAIT1 has not reached 0, control passes to step 1210 then to step 1022 to await the next timer interrupt. When count PRE_KILL_WAIT1 reaches 0, a second delay is effected by a counter PRE_KILL_WAIT2. Counter PRE_KILL_WAIT2 is decremented during each program cycle until it reaches 0 (step 1214). Once counter PRE_KILL_WAIT2 has decremented to 0, allowing time for the throttle to be fully closed, all power switches of H bridge 310 are closed (i.e., control signals TOP-L, TOP-R, BOT-L, and BOT-R are taken low), effectively stalling engine 102 (step 1216).

Voltage feedback signal VFB from floating voltage feedback circuit 118, indicative of engine RPM and load demand, is applied to an analog to digital converter of microcomputer 900. The resulting value, variable VDC, corresponds to the magnitude of signal VFB. In the execution of main loop 1000, assuming no serious overcurrent or short circuit conditions exist, the voltage of signal VFB is sampled once each program cycle (step 1008). As will be more fully explained, the voltage of signal VFB is employed as the primary control parameter for engine speed during the load demand mode of operation and is used in detecting overcurrent conditions. More specifically, after signal VFB is sampled, the state of mode selection switch 122 is tested as indicated by signal MODE and corresponding variable MODE. If load demand mode is indicated (MODE=1), a subroutine for adjusting engine speed in accordance with load demand, i.e. in accordance with the magnitude of signal VFB, is called (step 1012).

In general, any subroutine for controlling the throttle setting in accordance with load demand (e.g., as indicated by the magnitude of signal VFB) may be utilized. For example, signal VFB (or variable VDC) may be compared against a set point (or dead band) and the throttle setting adjusted upward or downward in accordance with the comparison. If desired, multi-window voltage regulation (i.e., feedback control) may be utilized where the rate of throttle adjustment is a function of deviation from a desired value. Indicia of respective threshold values denominating respective adjustment mode bands are maintained as variables or constants in memory: VDC_HI, VDC_THI, VDC_HI3, VDC_LO, VDC_TLO, and VDC_LO3. Throttle adjustments are suitably made at a rate and direction based upon where the magnitude of signal VFB (or variable VDC) falls relative to the adjustment bands defined by a suitable threshold value as shown in Table 4.

TABLE 4

| | | Throttle Adjustment | |
| --- | --- | --- | --- |
| Mode | VFB Range | Direction | Rate |
| Mode 1 | VDC_LO >VFB >VDC_TLO | Open | Normal |
| Mode 2 | VDC_HI >VFB >VDC_LO | No Adjustment | |
| Mode 3 | VDC_THI >VFB >VDC_HI | Close | Normal |
| Mode 4 | VDC_TLO >VFB >VDC_LO3 | Open | Fast |
| Mode 5 | VDC_HI3 >VFB >VDC_THI | Close | Fast |
| Mode 6 | VDC_LO3 >VFB | Open | Faster |
| Mode 7 | VFB >VDC_HI3 | Close | Faster |

Figure 13:
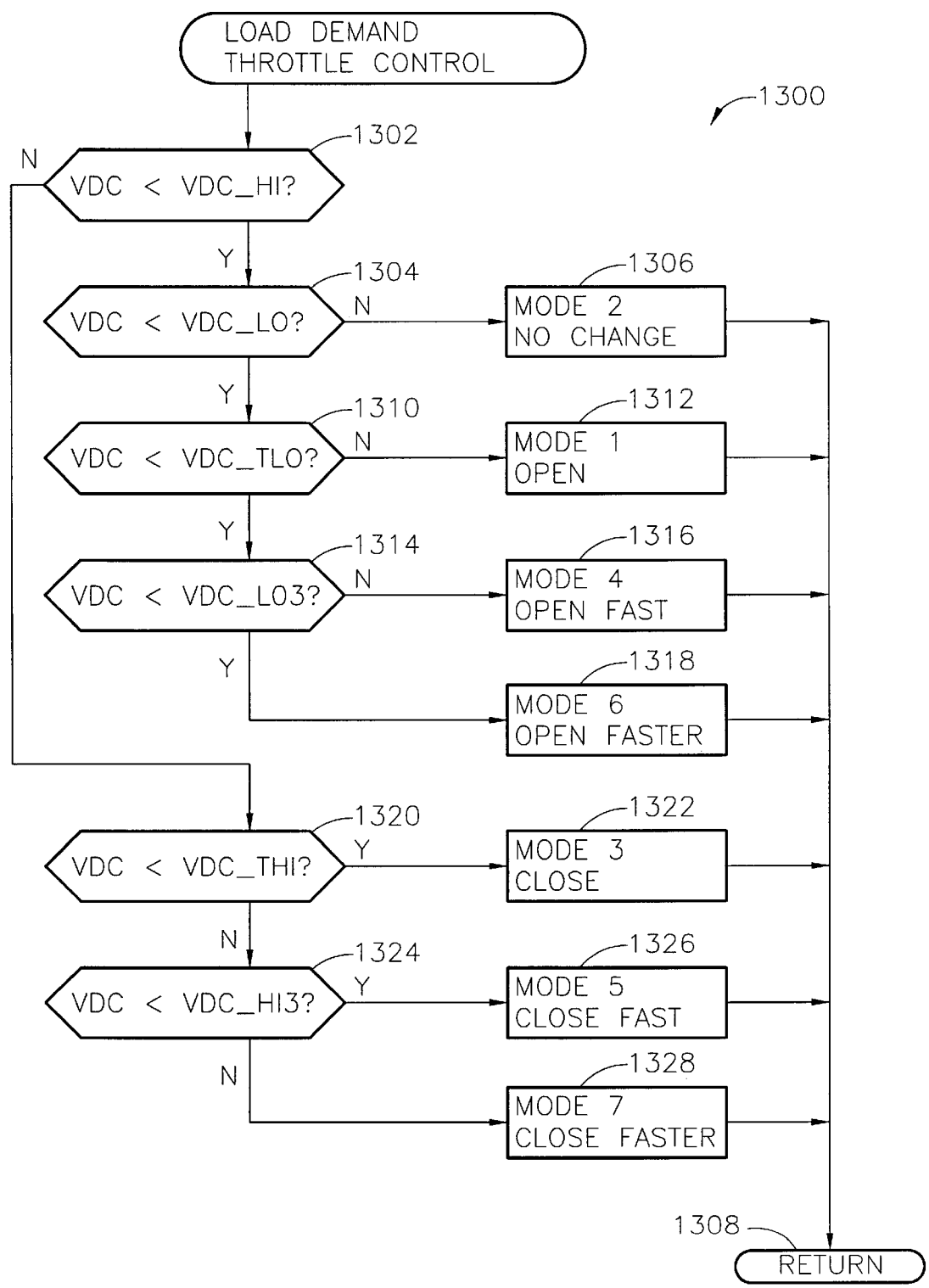
Figure 14A:
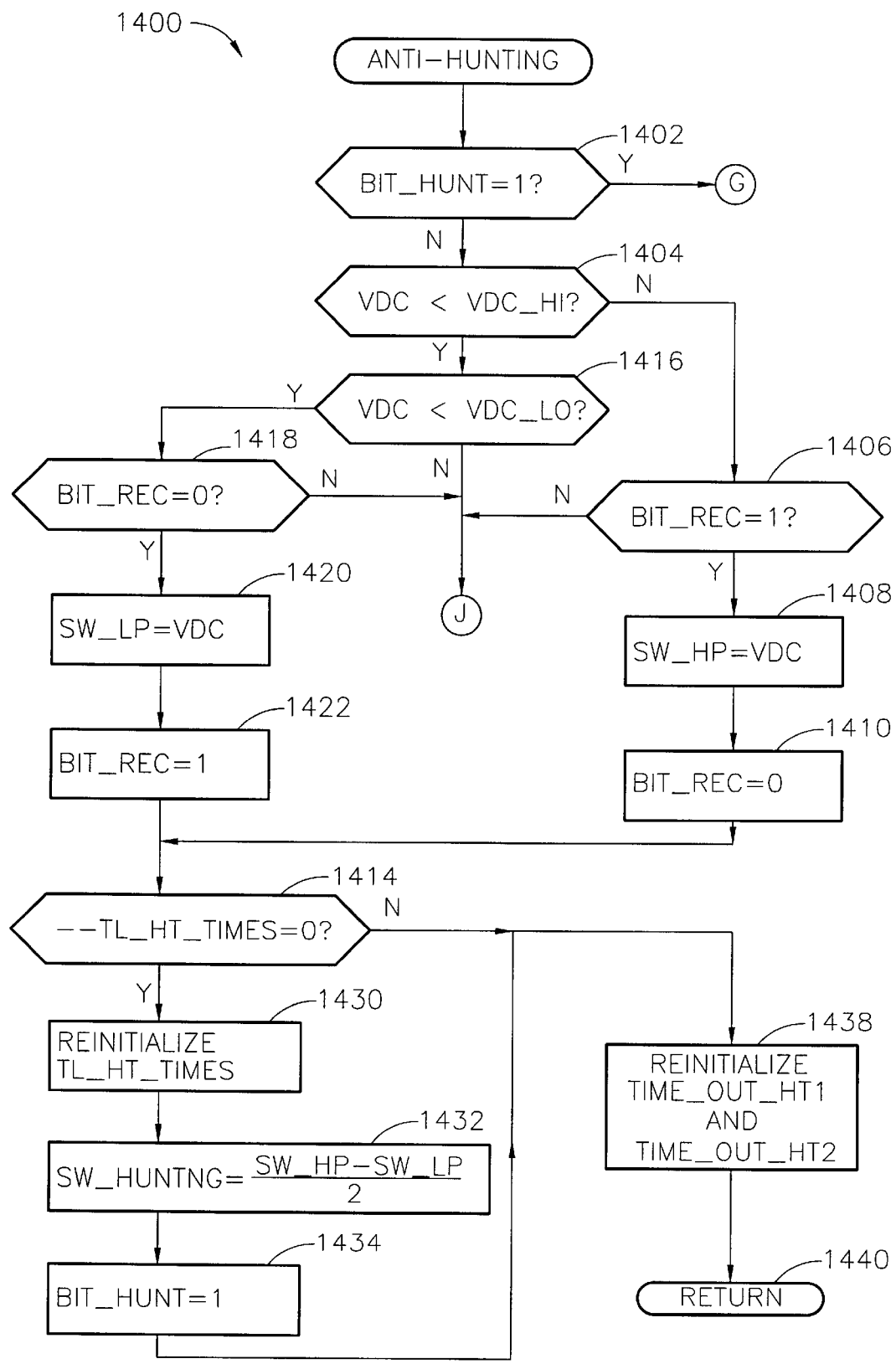
Figure 14B:
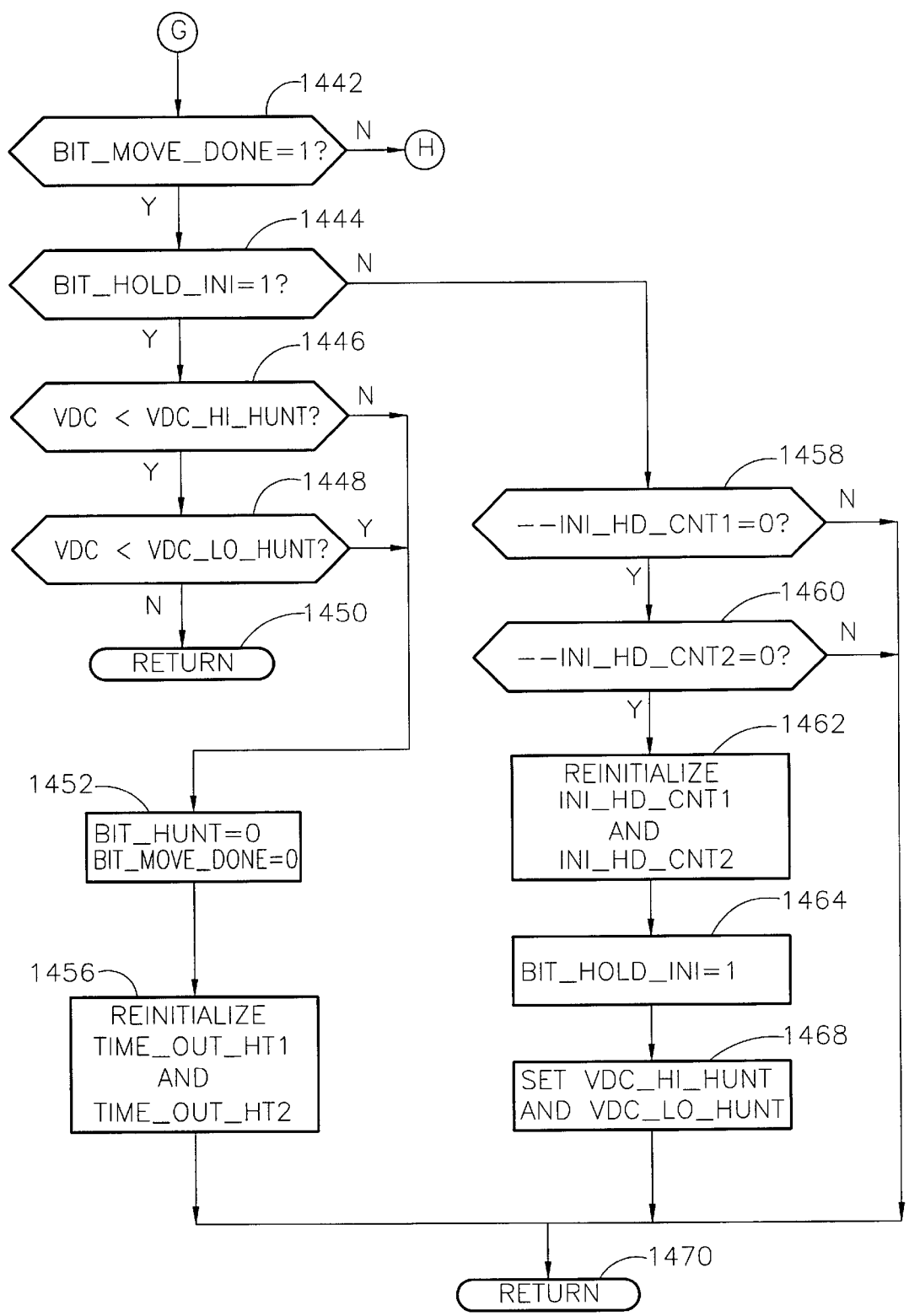
Figure 14C:
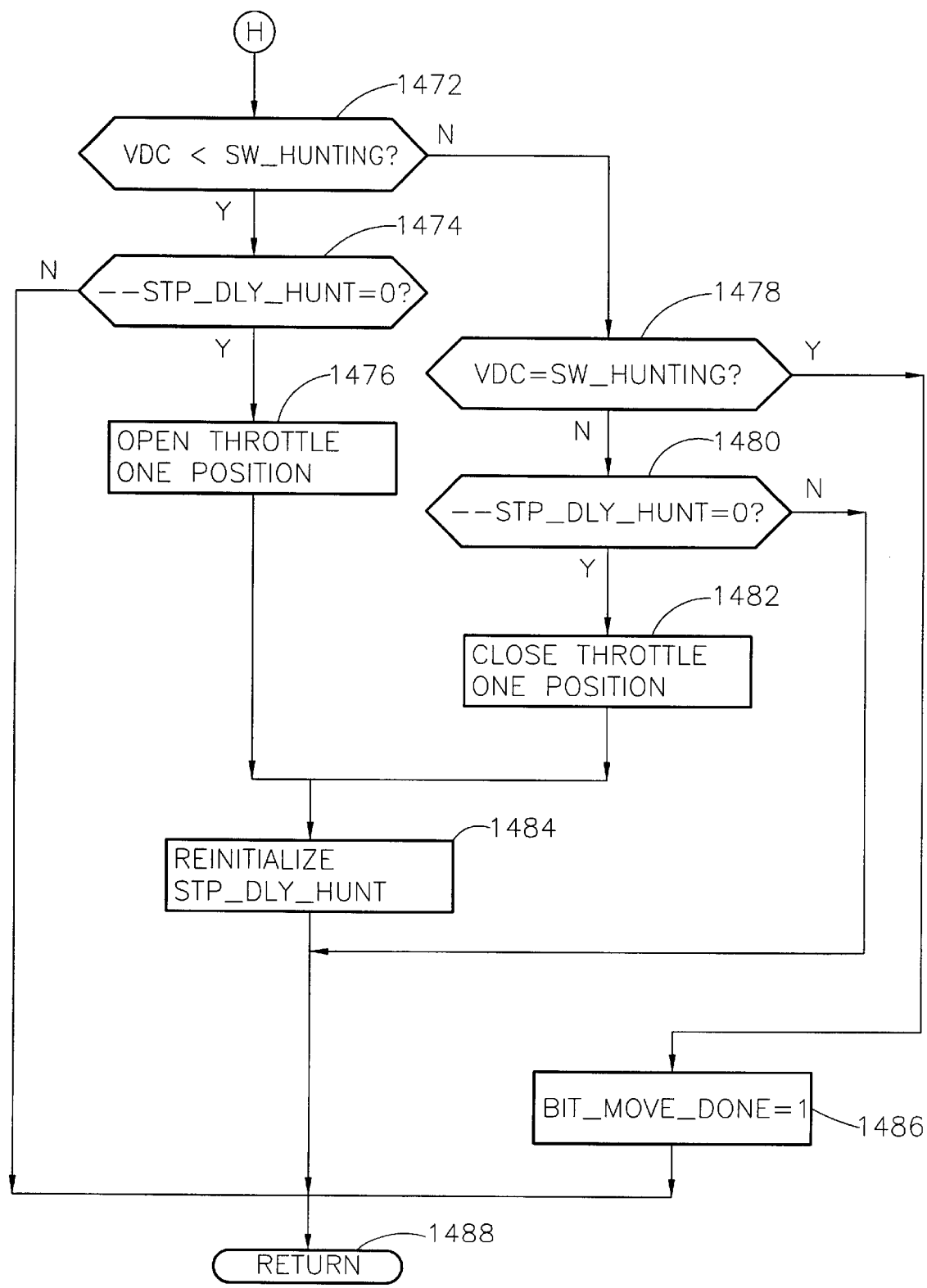
Figure 14D:
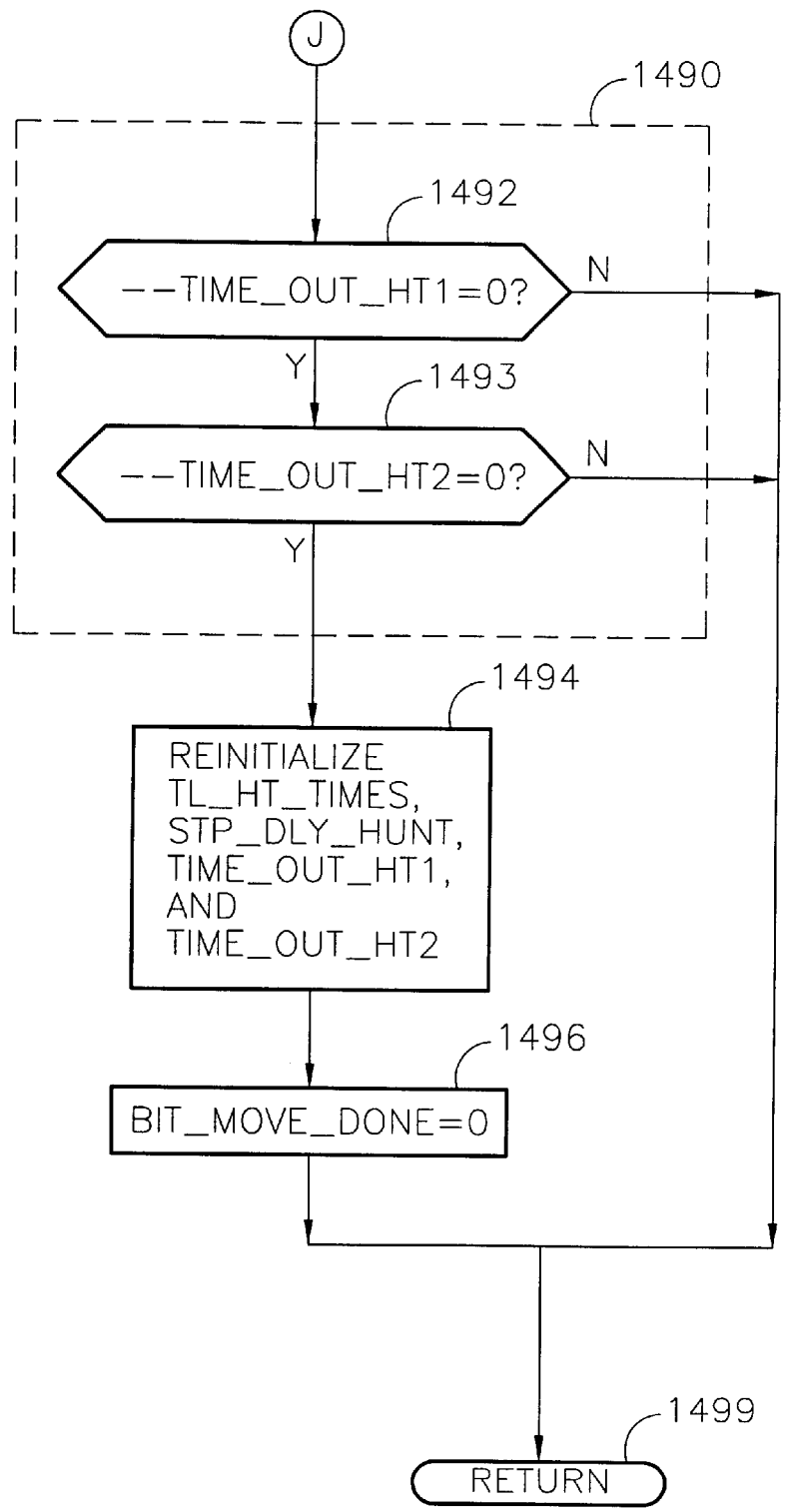

Referring now to FIG. 13, when a load demand regulation subroutine is performed, variable VDC is tested (step 1302) against VDC_HI, the upper value of a dead band (no adjustment zone).

If VDC is less than VDC_HI, it is then tested against the lower edge of the dead band VDC_LO (step 1304). If VDC is not less than VDC_LO, it falls within the dead band, so no change of throttle position is called for and operation in Mode 2 continues as indicated for the sake of illustration as step 1306. A return to main loop 1000 is then effected (step 1308). If VDC is less than VDC_LO, it is then tested against the lower edge value of a first lower adjustment band VDC_TLO (step 1310). If VDC is not less than VDC_TLO (i.e., VDC is within the first lower adjustment band), microcomputer 900 generates signals TR1-4 to throttle control driver 113 to open the throttle at a normal rate for operation in Mode 1 (step 1312). If VDC is less than VDC_TLO, VDC is then tested against the lower edge of a second lower adjustment band VDC_LO3 (step 1314). If VDC is not less than VDC_LO3 (i.e., VDC is within the second lower adjustment band), microcomputer 900 generates signals TR1-4 to throttle control driver 113 to open the throttle at a faster than normal rate for operation in Mode 4 (step 1316). If VDC is less than VDC_LO3 (i.e., VDC is beyond the second lower adjustment band), microcomputer 900 generates signals TR1-4 to throttle control driver 113 to open the throttle at yet a faster rate for operation in Mode 6 (step 1318).

Conversely, if the test of VDC against the dead band upper value VDC_HI indicates that VDC is not less than VDC_HI (step 1302), VDC is tested against the upper edge value of a first upper adjustment band VDC_THI (step 1320). If VDC is less than VDC_THI (i.e., VDC is within the first upper adjustment band), microcomputer 900 generates signals TR1-4 to throttle control driver 113 to close the throttle at normal rate for operation in Mode 3 (step 1322). If VDC is not less than VDC_THI, VDC is then tested against the upper edge of a second upper adjustment band VDC_HI3 (step 1324). If VDC is less than VDC_HI3 (i.e., VDC is within the second upper adjustment band), microcomputer 900 generates signals TR1-4 to throttle control driver 113 to close the throttle at a faster than normal rate for operation in Mode 5 (step 1326). If VDC is not less than VDC_HI3 (i.e., VDC is beyond the second upper adjustment band), microcomputer 900 generates signals TR1-4 to throttle control driver 113 to close the throttle at yet a faster rate for operation in Mode 7 (step 1328). After the throttle adjustments are effected, a return to main loop 1000 is effected (step 1308).

In some instances, particularly with 2-cycle engines, changes in load may cause portions of the system that control RPM (e.g., spark control, RPM control in response to voltage or current, the mechanical response of the engine, throttle control, or the mechanical response of the throttle apparatus) to respond in a manner that gives rise to engine speed variations that may be cyclic at a comparatively low frequency (e.g., one or more seconds per cycle). Because engine noise follows to engine speed, the cyclic noise may be objectionable to users. Further, output voltage or current control may be adversely affected by the cyclic engine speed. The objectionable cyclic variation is called abnormal hunting. Accordingly, it is sometimes desirable to detect abnormal hunting, and, in effect, adopt the center (average) setting of the range through which hunting occurs. For example, when operating in a normal mode (prior to detecting abnormal hunting), engine RPM may be monitored and compared to determine whether the present RPM is within a dead band, i.e., a zone in which no throttle adjustment is desired. Alternatively, any of several physical measurements may serve as a proxy for RPM by being related to RPM in a predetermined manner (e.g., a voltage produced by a winding, a rectified voltage, a DC rail voltage, an output voltage of an inverter, etc.). If RPM is found to be not within the dead band, or if RPM has been outside the dead band for a predetermined duration, or (preferably) if RPM has been recognized as being alternately out of the dead band on the high side and out of the dead band on the low side (e.g., for a predetermined number of occurrences), an anti-hunting mode of operation is begun. While in anti-hunting operating mode, the following steps may be preformed in any order:

a. monitor RPM (or a proxy) to provide a monitored value that tracks present RPM;

b. determine a minimum out of band value by comparing the monitored value to thresholds defining a first band;

c. determine a maximum out of band value by comparing the monitored value to the thresholds defining the first band;

d. calculate a mid point value between the minimum and maximum out of band values;

e. compare the monitored value to the mid point value and if substantially different then move the throttle so as to change RPM to bring RPM (or the proxy) closer to the mid point of the first band (e.g., if out of band on the low side, open throttle; otherwise close throttle);

f. repeat steps a. and e. until the monitored value is substantially equal to the mid point value;

g. after step f., establish threshold values that define a hunting band, monitor RPM, and if the monitored value is outside the hunting band, terminate anti-hunting mode of operation and return to normal mode of operation.

Throttle control may be incremental (e.g., digital control) or by continuous analog control. The hunting band may be centered at the mid point value or suitably positioned in any manner to accommodate an observed trend. Step g. may be omitted when the dead band thresholds provide adequate anti-hunting behavior. When load changes do not frequently cause RPM to deviate from the dead band, step g. may be omitted and anti-hunting mode may be terminated at step f. Alternately, hunting band thresholds may define the hunting band narrower, identical, or wider than the dead band. Hunting band thresholds that exceed in absolute value the corresponding dead band threshold values by, for example, 5% to 20% (preferably 10%) provide reduced sensitivity to load variation and reduce objectionable abnormal hunting noise.

Referring to FIG. 14, a suitable anti-hunting subroutine will be described. When anti-hunting subroutine 1400 is performed, a determination is made as to whether the system is already in a anti-hunting mode. Because a flag, BIT_HUNT, is set when an anti-hunting mode of operation is begun, the determination is made by testing BIT_HUNT (step 1402).

Assuming that the system is not already in an anti-hunting mode, a determination is made as to whether variable VDC corresponding to floating voltage feedback signal VFB is within the dead band (i.e. VDC_HI>VDC>=VDC_LO) and if it is not, the high or low value of VDC is recorded. VDC is first compared to VDC_HI (step 1404). If VDC is greater than or equal to VDC_HI, flag BIT_REC is tested (step 1406). If flag BIT_REC is set (indicating that the last recorded value was below the dead band), the value of VDC is recorded in variable SW_HP as a high point (step 1408). Flag BIT_REC is then reset to zero (step 1410) in preparation for recording a low point of the voltage swing.

If VDC is less than the upper edge of the dead band (step 1404), VDC is then compared to VDC_LO (step 1416). If VDC is below the dead band, then steps 1418–1422, which are analogous to steps 1406–1410, are effected. By setting and testing flag BIT_REC, alternating excursions of VDC out of the dead band in each direction are tracked against a counter for total out-of-dead-band conditions (e.g., hits) by the counter TL_HT_TIMES. If VDC leaves the dead band on the high side, re-enters the dead band, then leaves the dead band again on the high side, no out-of-dead-band condition is considered to have occurred and a hunting time is measured, lapse of which causes a reinitialization of the anti-hunting subroutine (e.g., procedure 1489 of FIG. 14D). Likewise, if VDC remains in the dead band, reinitialization will occur after lapse of the hunting time (e.g., procedure 1489 of FIG. 14D).

Count TL_HT_TIMES, initialized with a predetermined number, is decremented and compared with zero (step 1414). When count TL_HT_TIMES decrements to zero, count TL_HT_TIMES is reinitialized, the average of (i.e., mid point between) the recorded high and low points is calculated (step 1432), and flag BIT_HUNT is set (step 1434). Counters and timers are then reinitialized, for example, including TIME_OUT_HT1 (step 1436) and TIME_OUT_HT2 (step 1438), discussed below with reference to FIG. 14D.

During the next cycle, an anti-hunting mode of operation is indicated (step 1402). Accordingly, a throttle adjustment may be made and, if made, conditions for avoiding making further throttle adjustments may be invoked (e.g., a delay time between adjustments and/or a hunting band, preferably surrounding the dead band). For example, a determination may be made as to whether a successful throttle adjustment has been made. A successful throttle adjustment may be indicated by a flag, for example, flag BIT_MOVE_DONE. If a throttle adjustment has been made, an initial duration has lapsed, and variable VDC remains within a hunting band (e.g., VDC_LO_HUNT<VDC<VDC_HI_HUNT), anti-hunting subroutine returns (step 1450) to main loop 1000. Otherwise, anti-hunting mode may be terminated.

For example, if flag BIT_MOVE_DONE is equal to 1 (step 1442), indicating that the throttle has been recently adjusted, it is next determined whether a delay has lapsed. If flag BIT_HOLD_INI is not zero (step 1444), counters INI_HD_CNT1 and 2 are decremented in turn and compared to 0 in a 2-tier delay loop (steps 1458, 1460). If the delay has not yet lapsed, control passes to step 1470 where a return to main loop 1000 is effected. If the delay has lapsed, counters INI_HD_CNT1 and 2 are reinitialized (step 1462), flag BIT_HOLD_INI is set to 1 (step 1464), variables that define the hunting band are set (step 1468) and a return is effected to main loop 1000.

The hunting band may be set to surround the dead band. In other words, to reduce the sensitivity to making further changes to throttle position, changes will only be made if the value of VDC is outside a hunting band. The hunting band may be defined by two threshold values, for example, VDC_LO_HUNT and VDC_HI_HUNT. When the hunting band has the same mid point as the dead band (VDC_LO to VDC_HI) VDC-LO_HUNT may be set at any suitable fraction (e.g., in the range from 99% to 80%) of VDC_LO or a predetermined amount (e.g., a delta in the range from 0.1 2.0 volts) lower than VDC_LO. Likewise, VDC_HI_HUNT may be set at any suitable fraction (e.g., in the range from 101% to 120%) of VDC_HI or a predetermined amount (e.g., a similar delta) higher than VDC_HI. A hunting band may be omitted when other system delays (e.g., mechanical response times) including INI_HD_CNT1 and 2, TL_HT_TIMES, TIME_OUT_HT1 and 2, and STP_DLY_HUNT provide sufficient anti-hunting functionality. When a hunting band is used, the extent of the hunting band may be any extent (e.g., less than or equal to the dead band, preferably greater than the dead band). The hunting mode of operation may be terminated on lapse of a predetermined time, or when variable VDC exceeds the limits of the hunting band.

If flag BIT_HOLD_INI is zero (step 1444) indicating that the delay has lapsed, a determination is made as to whether variable VDC is within the hunting band. For example, if variable VDC has a value between variables VDC_HI_HUNT and VDC_LO_HUNT (steps 1446, 1448), variable VDC is within the hunting band and a return (step 1450) is effected to main loop 1000. If variable VDC is not within the hunting band, operation in anti-hunting mode is terminated and subroutine state variables are reinitialized. For example, flags BIT_HUNT and BIT_MOVE_DONE are set to zero (step 1452) and counters TIME_OUT_HT1 and TIME_OUT_HT2 are reinitialized (step 1456) before a return (step 1470) is effected to main loop 1000.

If an adjustment to throttle position has not yet been made, variable VDC is compared to the mid point between the low and high values recorded on entry into anti-hunting mode (step 1432) to determine if the throttle should be opened (to produce higher RPM and consequently higher output voltage) or closed (to produce lower RPM and consequently lower values of output voltage) by, e.g., one increment. For example, if flag BIT_MOVE_DONE is not equal to 1 (step 1442), it is determined whether variable VDC is less than variable SW_HUNTING (step 1472). If so, a delay is measured (step 1474) during which throttle adjustments will not be made. If the delay as measured by decrementing variable STP_DLY_HUNT to zero (step 1474) has lapsed, the throttle is opened one position (step 1476) and variable STP_DLY_HUNT is reinitialized (step 1484); otherwise, a return (step 1488) is effected to main loop 1000. On the other hand, if variable VDC is not less than variable SW_HUNTING (step 1472), a determination is made as to whether variable VDC is substantially equal to SW_HUNTING (step 1478). If so, a successful throttle adjustment is indicated, for example, by setting flag BIT_MOVE_DONE to 1 (step 1486). Otherwise, a delay is measured (step 1480) during which throttle adjustments will not be made. If the delay as measured by decrementing variable STP_DLY_HUNT to zero (step 1480) has lapsed, the throttle is closed one position (step 1482) and variable STP_DLY_HUNT is reinitialized (step 1484). After reinitialization of the delay variable, STP_DLY_HUNT, a return (step 1488) is effected to main loop 1000.

When operation is not yet in anti-hunting mode and a predetermined number of excursions out of the dead band have not occurred within a predetermined time, state variables of anti-hunting subroutine 1400 may be reinitialized. For example, control may be transferred from steps 1406, 1416, or 1418, as discussed above, to a procedure 1489 of FIG. 14D having a 2-tier delay loop 1490. If the delay as measured by counters TIME_OUT_HT1 and TIME_OUT_HT2 has not yet lapsed, control returns to main loop 1000 at step 1499. If the delay has lapsed, state variables of subroutine 1400 are reinitialized, including, for example, counters TL_HT_TIMES, STP_DLY_HUNT, TIME_OUT_HT1, TIME_OUT_HT2 and flag BIT_MOVE_DONE is set to 0. After reinitialization, control returns to main loop 1000 at step 1499.

As previously noted, during execution of main loop 1000 and after signal VFB is sampled (step 1008), the state of mode selection switch 122 is tested by testing the variable MODE corresponding to signal MODE (step 1010). If battery charge/boost mode is indicated (MODE=0), subroutine 1500 for adjusting engine speed in accordance with the magnitude of DC output signal DCOUT is called (step 1014). Battery charge supervision circuit 114 preferably generates digital feedback signal BFB, indicative of a comparison between the magnitude of signal DCOUT and a selected set point value (e.g., BFB=1 if the magnitude of signal DCOUT exceeds the selected set point value; and, BFB=0 if the magnitude of signal DCOUT does not exceed the selected set point value). Microcomputer 900 effects incremental throttle control accordingly.

Figure 15:
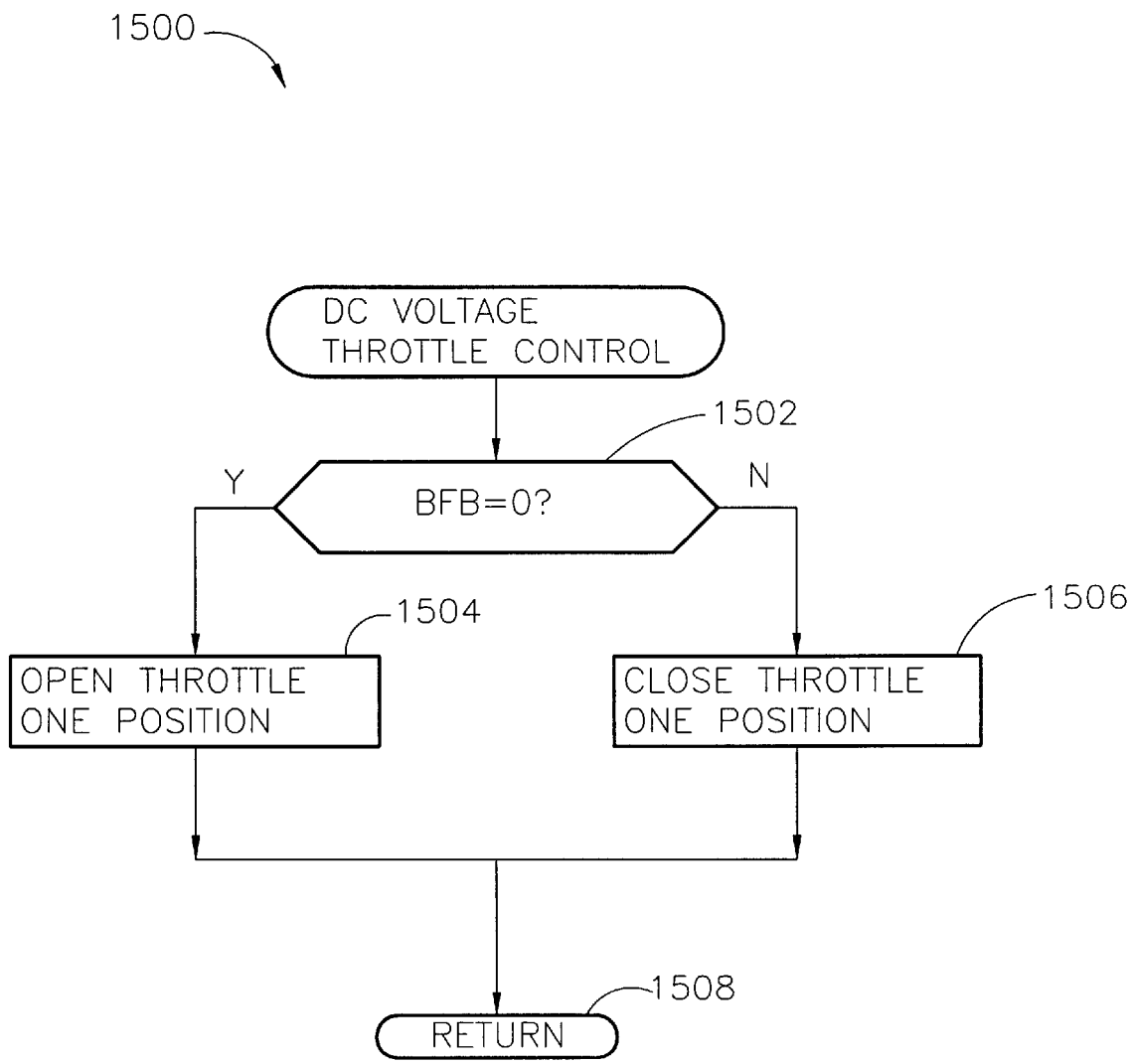

More particularly, referring to FIG. 15, flag BFB, corresponding to signal BFB, is tested against zero (step 1502). If flag BFB is equal to zero, indicating that signal DCOUT does not exceed the set point value, microcomputer 900 generates control signals TR1-4 to throttle control driver 113 to open throttle 128 by a predetermined number of units (e.g., one unit) (step 1504). On the other hand, if flag BFB is not equal to zero, indicating that DCOUT exceeds the selected set point value, microcomputer 900 generates control signals TR1-4 to throttle control driver 113 to close throttle 128 by a predetermined number of units (e.g., one unit) (step 1506). Throttle control signals dither about a setting corresponding to the set point value. So long as the incremental change in throttle setting is relatively small, such dithering tends to be imperceptible to users.

Figure 16:
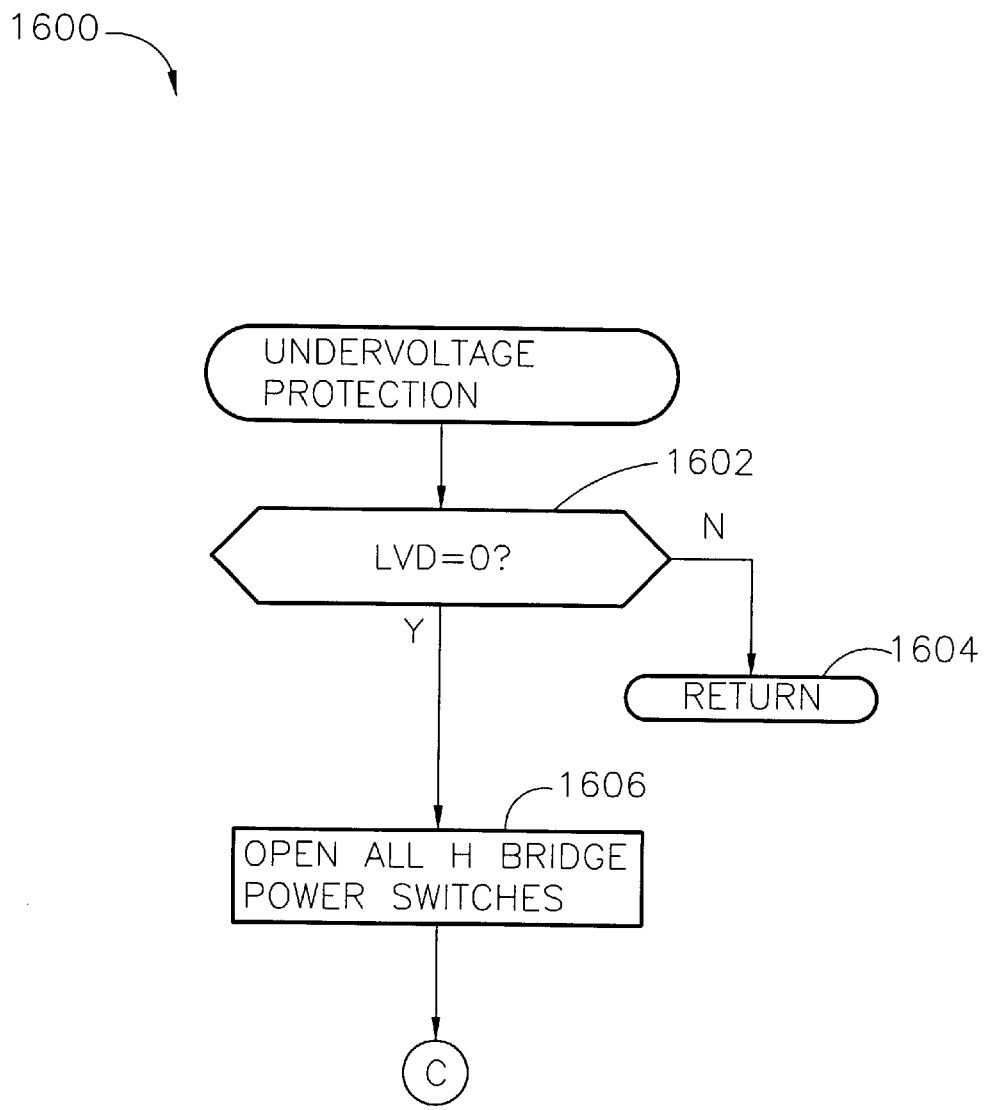

As previously discussed, the state of the supply voltages is monitored to prevent damage to various components of system 100. To this end, low voltage supervision circuit 124 provides signal LVD, reflecting the state of the 15-volt supply voltage. Referring briefly to FIG. 16, flag LVD corresponding to the state of signal LVD is tested (step 1602). If flag LVD is indicative of sufficient supply voltage (e.g., LVD is high), a return to the main subroutine is effected (step 1604). If, however, flag LVD indicates insufficient supply voltage (e.g., LVD is low), all power switches of H bridge 310 are opened (i.e., control signals TOP-L, TOP-R, BOT-L, and BOT-R, are taken high) (step 1606). Control then passes to step 1022 to await the next timer interrupt.

As previously discussed, short circuit detector 120 generates signal SHORT at a logic high when the source-drain voltage across bottom-right switch Q9/Q10 of H bridge 310 exceeds a predetermined reference value. Flag SHORT corresponds to signal SHORT. If the source-drain voltage across the bottom-right switch Q9/Q10 exceeds the predetermined level (i.e., flag SHORT=1) during a portion of the AC cycle when that switch is conductive, a short circuit is indicated. As noted above, short circuit protection subroutine 1700 tests flag SHORT to determine whether or not a short circuit condition exists, and if so, whether it has persisted for a predetermined duration. If a short circuit condition is detected, all power switches of H bridge 310 are opened (i.e., TOP-L, TOP-R, BOT-L, BOT-R are taken high) and switched capacitance circuit 107 is disabled (effectively removing capacitance from the operative circuit). If a short circuit condition has persisted for a predetermined duration, steps are taken to put system 100 in a condition for shut down and flag SC_KILL is set to 1. The system is then shut down by short circuit kill engine subroutine 1200 during the next program cycle.

More specifically, referring to FIG. 17, when short circuit protection subroutine 1700 is called, it first tests flag SC_SIGN (step 1702) to determine whether a short circuit condition was detected during an earlier cycle. If flag SC_SIGN is set, a return to main loop 1000 is effected (step 1704). If flag SC_SIGN is not set, a determination is made regarding the presence of a short circuit condition. Count HB_CNT, indicative of the instantaneous phase of signal ACOUT, is tested (step 1706) against a first predetermined count corresponding to the point in the cycle when the bottom-right switch Q9/Q10 of H bridge 310 (or analogously the top-left switch) is rendered conductive. If count HB_CNT indicates that switch Q9/Q10 is not presently conductive, a return to main loop 1000 is effected (step 1704). Otherwise, count HB_CNT is tested (step 1708) against a second predetermined count corresponding to the point in the cycle when switch Q9/Q10 is rendered nonconductive. If count HB_CNT has a value between the predetermined counts, the relevant portion of the cycle is indicated and flag SHORT is tested (step 1710). Otherwise, control returns to main loop 1000. If flag SHORT is low (indicating normal conditions) counter SC_CNT, containing a count indicative of the duration of a short circuit condition, is reset to 0 (step 1712) and a return to main loop 1000 is effected (step 1704). If, however, a short circuit condition is indicated, counter SC_CNT is compared (step 1714) to a count corresponding to a predetermined duration (e.g., 1 second).

If count SC_CNT is greater than or equal to the predetermined count, indicating that the short circuit condition has persisted for longer than the predetermined duration, a sequence of steps preparatory to shutting down system 100 is effected as follows. All of the coils of the stepper motor (part of throttle control 112) are turned off (step 1716). Flag SC_KILL is set to 1 (step 1718) so that execution of short circuit kill engine subroutine 1200 during the next program cycle will cause engine 102 to stall. Signal CAP_SW and all H bridge control signals are removed. Control then passes (step 1724) to(step 1022) await the next timer interrupt.

If the short circuit condition has not yet persisted for longer than a predetermined duration (i.e., count SC_CNT is less than a count corresponding to the predetermined duration), count SC_CNT is incremented (step 1726), all power switches of H bridge 310 are turned off (step 1728), switched capacitance circuit 107 is disabled (step 1730), flag CAP_IN is reset (step 1732) to inhibit switched capacitance circuit 107 from being enabled, flag SC_SIGN, indicative of the ongoing process of monitoring a particular short circuit condition, is set (step 1734), and a return to main loop 1000 is effected (step 1736).

As previously noted, H Bridge control subroutine 1800 is employed to generate control signals TOP-L, TOP-R, BOT-L, BOT-R, and CAP_SW to inverter 108. Control subroutine 1800 cooperates with short circuit protection subroutine 1700 in processing short circuit conditions. Microcomputer 900 maintains count HB_CNT indicative of the instantaneous phase of (e.g., number of 260 microsecond periods elapsed in) the present half cycle of signal ACOUT and respective reference values corresponding to the points in the AC half cycle when the respective power switches of H bridge 310 and switched capacitance circuit 107 are to be asserted and removed to generate the desired output waveform.

Specifically, such reference values suitably include: L_BRIDGE, corresponding to the count in the half cycle when a low-side switch (e.g., Q9/Q10 or Q7/Q8, depending upon the polarity of the half cycle) of H bridge 310 is opened; HI_BRIDGE, corresponding to the count in the half cycle when a high-side switch (e.g. Q4/Q3 or Q6/Q5, depending upon the polarity of the half cycle) of H bridge 310 is opened; CAP_OFF, corresponding to the count in the half cycle when switched capacitance circuit 107 is disabled; and CAP_ON, corresponding to the count in the half cycle when switched capacitance circuit 107 is enabled.

Referring to FIG. 18, when bridge control subroutine 1800 is performed, count HB_CNT is incremented (step 1802), then compared to reference count L_BRIDGE (step 1804). If count HB_CNT is less than the L_BRIDGE reference value, count HB_CNT is compared to reference value HI_BRIDGE (step 1806). If count HB_CNT is found to be greater than or equal to HI_BRIDGE, a suitable high-side H bridge power switch is opened (step 1808) and a return to main loop 1000 is effected (step 1810). If count HB_CNT is found to be less than the HI_BRIDGE reference value, switched capacitor enable flag CAP_IN is tested (step 1812). If switched capacitance circuit 107 is not enabled (e.g., CAP_IN was set to 0 during short circuit protection subroutine 1700), a return to main loop 1000 is effected (step 1810). If, however, switched capacitance circuit 107 is enabled (e.g., CAP_IN=1) count HB_CNT is compared (step 1814) to reference value CAP_OFF (i.e., a count when switched capacitance circuit 107 is to be disabled). If called for, signal CAPSW is set to disable switched capacitance circuit 107 (step 1816). If count HB_CNT is less than reference value CAP_OFF, it is then compared (step 1818) to reference value CAP_ON (i.e., a count when switched capacitance circuit 107 is to be enabled). If called for, signal CAPSW is set to enable switched capacitance circuit 107 (step 1820). After signal CAPSW is appropriately generated, a return to main loop 1000 is effected (step 1810).

If count HB_CNT is not less than reference value L_BRIDGE (step 1804), all power switches of H bridge 310 are opened (step 1822) to provide a dead time in the AC output waveform. Count HB_CNT is then tested (step 1824) against the count H_CYCLE, corresponding to completion of a half cycle. If less than a half cycle has elapsed, a return to main loop 1000 is effected (step 1808). If a half cycle has elapsed (e.g., count HB_CNT is greater than or equal to H_CYCLE), then flag SC_SIGN is tested (step 1826) to determine whether a short circuit condition is present.

If no short circuit condition is indicated, generation of the next half cycle of signal ACOUT is initiated as follows. If the pair of H Bridge switches: top-left (Q4/Q3) and bottom-right (Q9/Q10) was conductive, then the alternate pair of H Bridge switches: top-right (Q6/Q5) and bottom-left (Q7, Q8) will be rendered conductive to reverse the polarity of the AC output waveform (step 1828). Count HB_CNT is cleared (step 1830) and a return to main loop 1000 is effected (step 1810).

If a short circuit condition is indicated (step 1826), operation of H bridge 310 is, in effect, suspended for a predetermined duration. A preset counter SC_CNT is decremented toward 0 (step 1832). Until lapse of the duration established by counter SC_CNT, count HB_CNT is cleared (step 1830) during each program cycle and a return is effected to main loop 1000 (step 1810). If the short circuit condition persists through the end of the predetermined duration (i.e., count SC_CNT=0), the flag SC_SIGN is set to zero (step 1834), count SC_CNT is reinitialized (step 1836), switched capacitance circuit 107 is re-enabled (step 1838), and H bridge operation is resumed (step 1828).

Figure 19:
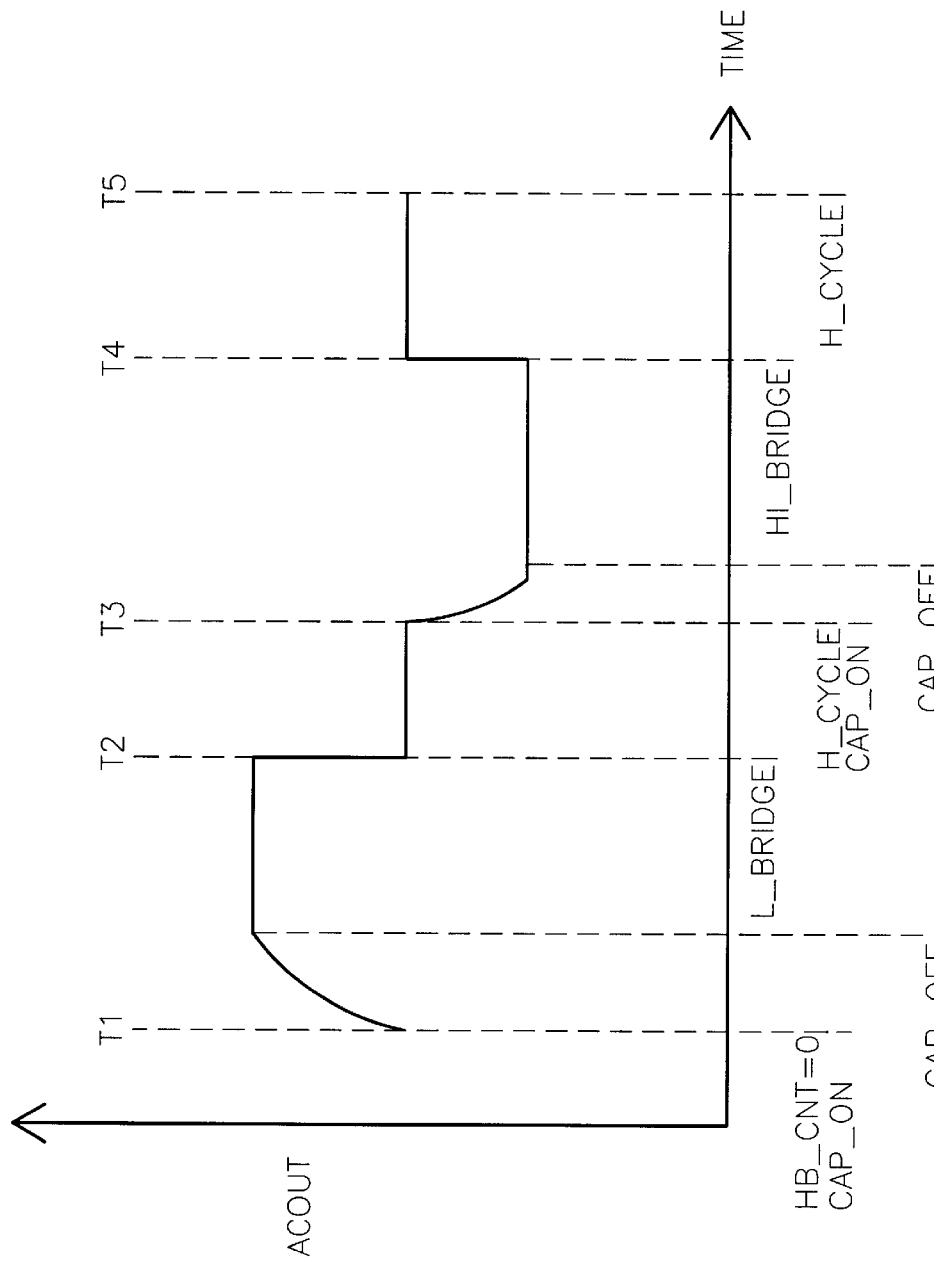
FIG. 19 is a graph of output voltage vs. time produced by the system of FIG. 1.

FIG. 19 illustrates an AC output waveform with dead time (T2–T3) between half cycles.

In another implementation, according to various aspects of the present invention, the stator includes a plurality of windings (not shown). For example, a first 3-phase winding for providing a relatively low voltage at a given RPM; and, a second 3-phase winding for providing a higher voltage than the first winding at the given RPM. For a desired output power (or desired output voltage regulation) the controller may determine which of the first and second windings will meet the output power requirement with the least RPM; and, based on that determination, direct a winding control circuit (not shown) to couple one of the first and second windings to the rectifier circuit. Operation of the engine at a reduced (or a tapped winding) and the system further includes an engine throttle controller and a winding control circuit. The winding control circuit selectively couples one or more windings of the plurality (or one or more turns of a tapped winding) to the rectifier circuit. The winding control circuit cooperates with a throttle controller to facilitate provision of a predetermined output power with a relatively low engine RPM for noise abatement.

Figure 20:
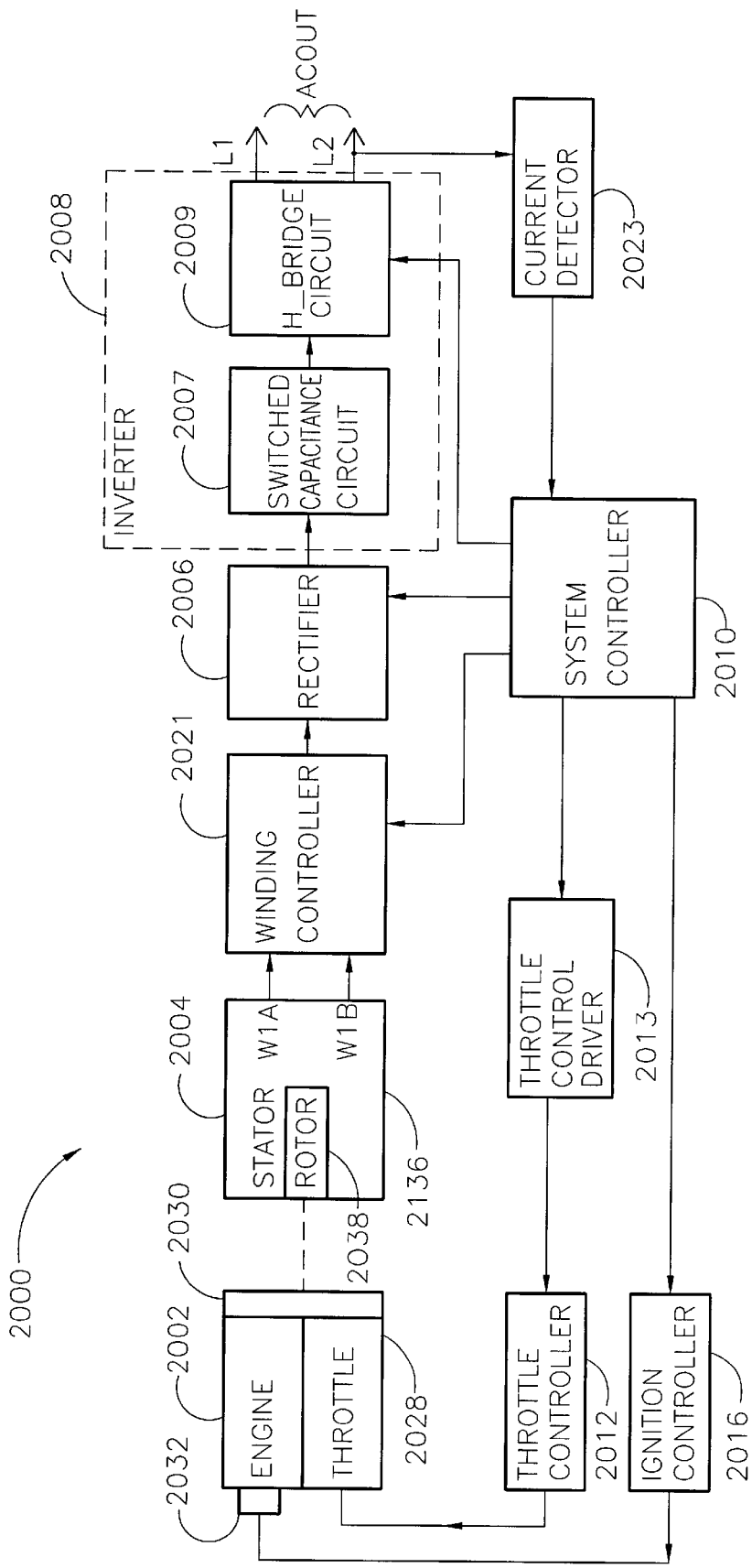
FIG. 20 is a functional block diagram for an alternate power conversion system according to the present invention.

A power conversion system may perform a noise abatement method according to various aspects of the present invention. When a substitute winding is available that would produce a higher voltage at the same RPM as the presently used winding, operating at a lower RPM with the substitute winding may provide the same output voltage with less noise. Selection of a substitute winding may be based in part on a comparison of the load current and the current rating of available windings. For example, system 2000 of FIG. 20 includes functional blocks that are identical in structure and function as those described above numbered less 1900, except as described below. System 2000 further includes current detector 2023 that provides an analog signal having indicia of the magnitude of current supplied to the load across terminals L1 and L2 (i.e., signal ACOUT) to controller 2010. Controller 2010 directs winding use via any conventional technique, for example, by directing a suitable winding controller 2021 that couples either winding W1A or W1B (e.g., each being a 3-phase winding) of stator 2036 to rectifier 2006. Any method of directing winding selection for noise abatement may be used.

Figure 21:
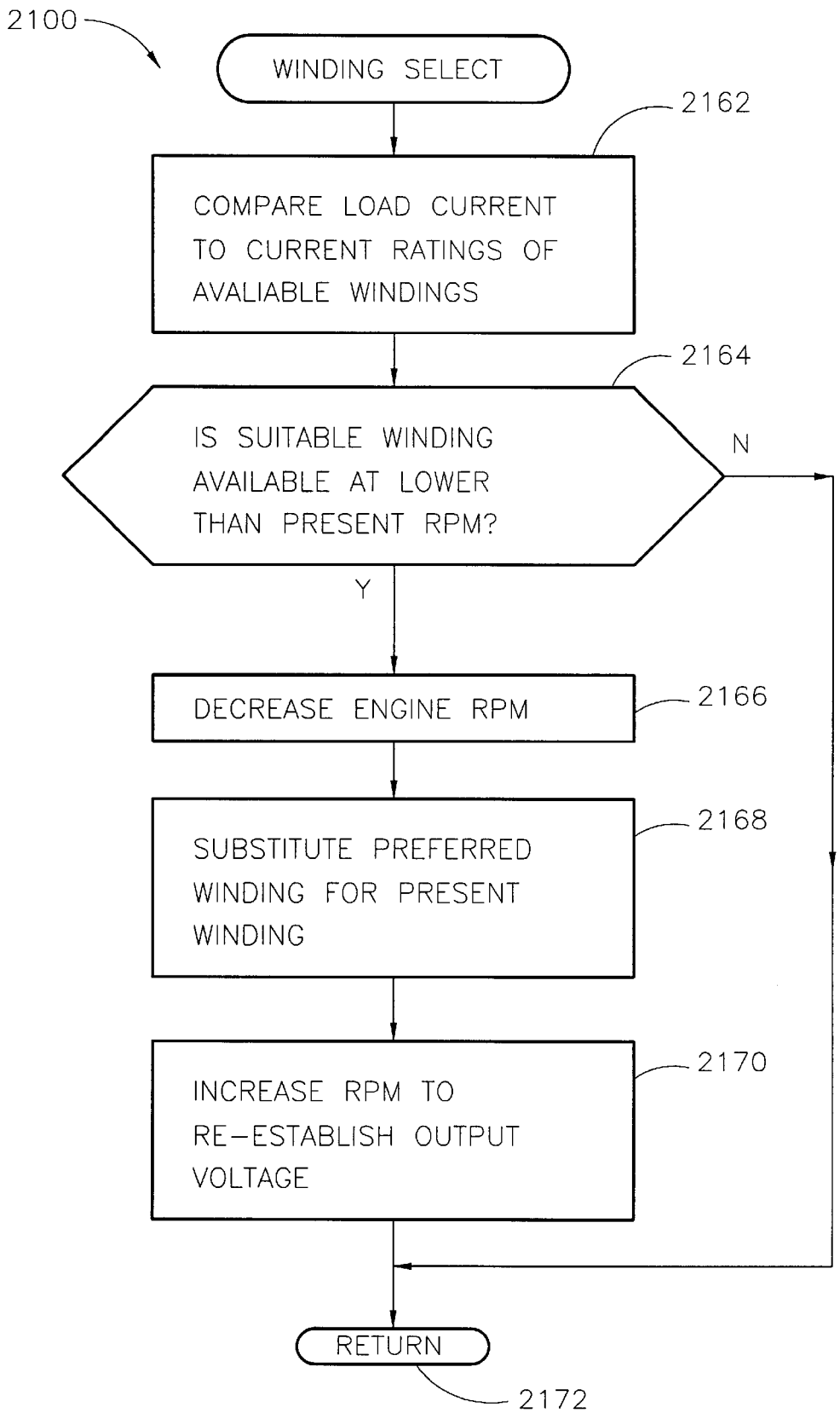
FIG. 21 is a flow chart for a method of noise abatement performed by a controller for the system of FIG. 20.

A method of winding selection for noise abatement according to various aspects of the present invention may be performed in hardware or software by system controller 2010 or winding controller 2021. For example, method 2100 of FIG. 21 is performed by system controller 2010. A call to method 2100 may be made at any suitable point in main loop 1000. In the discussion that follows, a substitute winding is understood to include a substitute configuration of one or more windings including tapped windings in any combination including a series and a parallel combination of one or more windings or tapped windings.

The presently provided load current is measured by current detector 2023 and reported to system controller 2010 (step 2162). The current may be measured and reported in any suitable manner including an average or RMS current per phase, or a peak current in any selected phase., including a phase having the maximum peak current of all phases. The presently provided voltage of signal ACOUT and the present RPM of generator 2004 (or of engine 2002 from which generator RPM may be deduced) may also be measured and reported. The output voltage and RPM may be understood to correspond to default or implied values when system 2000 is currently providing a predetermined output voltage or is maintaining a predetermined RPM.

A determination is made as to whether any other winding configuration is available or determined to be suitable for use in meeting the present measured output voltage and current (step 2164). For example, one or more tables of substitute windings may be maintained in memory accessible to system controller 2010. When a table is organized by voltage, current, and RPM, controller 2010 may select an entry of the table having suitable voltage and current at a lower than presently occurring RPM. If all entries in the table are specified at the same RPM, controller 2010 may calculate a ratio of output voltage specifications to determine whether operation at a lower RPM is feasible with a particular substitute winding. Feasibility may include a determination of whether a suitable output voltage tolerance can be maintained at a lower RPM. If no suitable substitute winding is available, a return is effected (step 2172).

If a substitute winding is available, a substitution is effected. Engine RPM is decreased in preparation for changing the winding configuration (step 2166). By decreasing RPM, an overvoltage condition may be avoided. The substitute winding (i.e., a preferred winding configuration) is substituted for the present winding (step 2168). RPM is increased to establish the desired output voltage (step 2170) and a return effected to main loop 1000 (step 2172). Substitution may be made in any conventional manner including by use of switching circuits or contactors. Make-before-break switching is preferred for operation with reactive loads.

Any of the above described techniques of maintaining RPM to control output voltage may be reinstituted if suspended during step 2166. RPM is adjusted to provide the desired output voltage from the substituted winding. When substitution of a tap or winding may cause a temporary but acceptable overvoltage condition step 2166 may be omitted and step 2170 effectively decreases RPM to reestablish the desired output voltage.

In an alternate method, engine RPM is decreased step 2166 and increased (step 2170) over the course of several program cycles. Any suitable state variables and counters for delays may be used to accomplish steps 2166 and 2170 over the course of several program cycles.

The techniques described above for substitution of windings for provision of signal ACOUT may be adapted for use in the provision of signal DCOUT. For example, a DC current detector may be used with respect to terminals analogous to B1 and B2 shown in FIG. 1.

The foregoing is a description of preferred exemplary embodiments and best mode of the invention known to the applicant at the time of filing the application. The invention is not limited to the specific forms shown. For example, modifications may be made in the design and arrangement of the elements within the scope of the invention, as expressed in the appended claims.

What is claimed is:

1. A power conversion system comprising:
   a. an engine comprising an output shaft, the shaft in operation having a shaft speed in revolutions per minute, the shaft speed responsive to an ignition signal;
   b. a generator coupled to the shaft to provide a power signal having a voltage responsive to the shaft speed; and
   c. a circuit that receives the power signal and provides the ignition signal in response to the voltage of the power signal thereby maintaining the voltage of the power signal below a limit.

2. The power conversion system of claim 1 wherein:
   a. the engine further comprises at least one spark plug; and
   b. the circuit further comprises:
      (1) a magneto driven by the engine for generating a magnetic flux in the magneto, the magneto being electrically coupled to the spark plug for providing to the spark plug via the ignition signal energy for generating a spark in response to the magnetic flux;
      (2) a shunt coupled to the magneto to attenuate the magnetic flux in response to the voltage of the power signal.

3. The power conversion system of claim 2 wherein:
   a. the magneto further comprises a winding having a current responsive to the magnetic flux and a switch in series with the winding for interrupting the current; and
   b. the shunt is coupled across the switch for facilitating flow of the current in the winding when the switch is open.

4. The power conversion system of claim 3 wherein:
   a. the winding comprises a first coil and a second coil;
   b. the second coil is coupled to provide the ignition signal to the spark plug; and
   c. the current is conducted in the primary coil.

5. The power conversion system of claim 2 wherein the shunt comprises a silicon controlled rectifier.

6. The power conversion system of claim 5 wherein:
   a. the circuit further comprises a rectifier that provides a rectified signal in response to the voltage of the power signal; and
   b. the SCR comprises a gate coupled to the rectifier and responsive to the rectified signal for triggering conduction of the SCR.

7. The power conversion system of claim 6 wherein:
   a. the rectified signal is coupled to the gate via a trigger circuit having a trigger voltage; and
   b. the limit is determined in accordance with the trigger voltage.

8. The power conversion system of claim 7 wherein the trigger circuit comprises a zener diode having a break-over voltage for determining the trigger voltage.

9. A power conversion system comprising:
   a. an engine having at least one spark plug;
   b. a generator that provides a current, the generator comprising:
      (1) a stator and;
      (2) a rotor rotatably mounted with respect to the stator so as to generate the current upon rotation, the engine being coupled to the rotor so as to rotate the rotor;
   c. a rectifier circuit that rectifies the current to provide a first signal having a voltage; and
   d. an ignition circuit that receives the first signal and supplies spark current to the spark plug, the ignition circuit attenuating the spark current in response to the voltage of the first signal thereby maintaining the voltage of the first signal below a limit.

10. The system of claim 9 wherein:
   a. the engine comprises a throttle that governs a speed of rotation of the rotor;
   b. the stator comprises a plurality of windings; and
   c. the system provides an output current to a provided load, the system further comprising:
      (1) a throttle controller that operates the throttle in response to a second signal;
      (2) a winding control circuit that selectively couples a winding of the plurality to the rectifier circuit in response to a third signal;
      (3) a detector for providing a fourth signal in accordance with a magnitude of the output current; and
      (4) a controller that provides the second signal and the third signal both in response to the fourth signal for noise abatement.

11. A power conversion system that provides a DC output signal and an AC output signal, the system comprising:
   a. an engine comprising a spark plug, a throttle, and a shaft being driven by the engine at a rate of rotation;
   b. a magneto driven by the engine for generating a magnetic flux in the magneto, the magneto being electrically coupled to the spark plug for providing operative energy to the spark plug in response to the magnetic flux;
   c. a generator comprising a first winding and a second winding, the generator coupled to the shaft for generating a respective current in each winding;
   d. a first rectifier coupled to the first winding for providing a rectified signal;
   e. an inverter responsive to the rectified signal for providing an output current to establish the AC output signal across a provided load;
   f. a voltage detector coupled to the first winding for providing a first signal in response to a voltage across the first winding;
   g. a second rectifier coupled to the second winding for providing the DC output signal, a second signal and a third signal, the second and the third signals being provided in accordance with a magnitude of the DC output signal;
   h. a shunt coupled to the magneto to attenuate the magnetic flux in response to the second signal; and
   i. a controller that provides a fourth signal in response to the first signal in a first mode of operation and to the third signal in a second mode of operation, the throttle operative in response to the fourth signal.

12. The power conversion system of claim 11 wherein:
   a. the generator further comprises a third winding;
   b. the system further comprises:
      (1) a circuit that selectively couples at least one of the first winding and the third winding to the rectifier in response to a fifth signal; and
      (2) a current detector for providing a sixth signal in accordance with the output current; and
   c. the controller provides the fifth signal in response to the sixth signal for noise abatement.

13. The power conversion system of claim 12 wherein the controller performs a method for providing the fourth signal comprising:
   determining a magnitude in accordance with the first signal;
   comparing the magnitude to a first threshold value and to a second threshold value;
   when the magnitude is between the first and the second threshold values, adjusting the throttle at a first rate of change of throttle position; and
   when the magnitude is not between the first and the second threshold values, adjusting the throttle at a second rate of change of throttle position, the second rate being greater in absolute value than the first rate.

14. The power conversion system of claim 13 wherein:
   a. when the absolute value of the magnitude is greater than the respective absolute values of both the first and the second threshold values, the adjustment is made at the second rate of change; and
   b. when the absolute value of the magnitude is less than the respective absolute values of both the first and the second threshold values, the adjustment is made at a third rate of change of throttle position, the third rate being less in absolute value than both the first rate and the second rate.

15. A power conversion system that provides an AC output signal, the system comprising:
   a. an engine;
   b. a generator comprising a first winding, the generator coupled to the shaft for generating a respective current in the first winding;
   c. a first rectifier coupled to the first winding for providing a rectified signal;
   d. an H bridge inverter responsive to the rectified signal for providing an output current to establish the AC output signal across a provided load, the inverter comprising:
      (1) a first pair of switches for providing the output current in a first direction through the load; and
      (2) a second pair of switches for providing the output current in a second direction through the load; and
   e. a controller, coupled to the first pair of switches and to the second pair of switches to operate the inverter in one of:
      (1) a first mode wherein the first pair of switches is closed and the second pair of switches is open;
      (2) a second mode wherein the second pair of switches is closed and the first pair of switches is open; and
      (3) a third mode wherein one switch of the first pair of switches is closed, the other switch of the first pair is open, and the second pair of switches is open, thereby providing a closed path for reactive load current to continue through the one switch.

16. A power conversion system that provides an AC output signal, the system comprising:
   a. an engine comprising a throttle having a throttle position, and a shaft being driven by the engine at a rate of rotation in accordance with the throttle position;
   b. a generator comprising a first winding, the generator coupled to the shaft for generating a respective current in the first winding;
   c. a first rectifier coupled to the first winding for providing a rectified signal;
   d. an inverter responsive to the rectified signal for providing an output current to establish the AC output signal across a provided load;
   e. a voltage detector coupled to the first winding for providing a first signal in response to a voltage across the first winding; and
   f. a controller that provides a second signal, the throttle operative in response to the second signal, the controller performing a method for providing the second signal comprising:
      determining a magnitude of the first signal;
      determining a first band; and
      when the magnitude is outside the first band:
         determining a threshold value;
         adjusting the throttle position in accordance with comparing the magnitude with the threshold value;
         determining a second band; and
         refraining from further adjustment of the throttle until after the magnitude is outside the second band.

17. A method for controlling engine speed in a power conversion system, the method comprising:
- monitoring indicia of engine speed to provide a monitored value;
- determining a minimum out-of-band value and a maximum out-of-band value by comparing the monitored value to respective thresholds defining a first band;
- determining a mid point value between the minimum and maximum out-of-band values; and
- comparing the monitored value to the mid point value and if substantially different, then adjusting the throttle so as to change engine speed to bring the monitored value closer to the mid point value and inhibiting further adjustment to the throttle until lapse of a predefined delay.

18. The method of claim 17 wherein the steps of determining a minimum out-of-band value and a maximum out-of-band value are repeated to detect engine speed that leaves the first band by alternately crossing the thresholds that define the first band.

19. A method for controlling engine speed in a power conversion system, the method comprising:
- monitoring indicia of engine speed to provide a monitored value;
- determining a minimum out-of-band value and a maximum out-of-band value by comparing the monitored value to respective thresholds defining a first band;
- determining a mid point value between the minimum and maximum out-of-band values;
- comparing the monitored value to the mid point value and if substantially different, then adjusting the throttle so as to change engine speed to bring the monitored value closer to the mid point value; and
- repeating the steps of monitoring and comparing until the monitored value is substantially equal to the mid point value.

20. The method of claim 19 further comprising:
- in association with determining the mid point value, establishing indicia that operation is in an anti-hunting mode, wherein the steps of comparing and repeating are not performed unless the indicia indicate operation is in the anti-hunting mode;
- after the step of repeating:
  - establishing the second threshold values that define a second band; and
  - if the monitored value is outside the second band, establishing the indicia that operation is no longer in the anti-hunting mode.

\* \* \* \* \*